(12) United States Patent
Fukasawa

(10) Patent No.: US 8,059,310 B2
(45) Date of Patent: Nov. 15, 2011

(54) APPARATUS, METHOD AND COMPUTER PROGRAM PRODUCT FOR PROVIDING OUTPUT IMAGE ADJUSTMENT FOR IMAGE FILES

(75) Inventor: Kenji Fukasawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 518 days.

(21) Appl. No.: 12/004,942

(22) Filed: Dec. 20, 2007

(65) Prior Publication Data

US 2008/0117446 A1 May 22, 2008

Related U.S. Application Data

(63) Continuation of application No. 09/974,906, filed on Oct. 12, 2001, now Pat. No. 7,330,286.

(30) Foreign Application Priority Data

| Oct. 13, 2000 | (JP) | 2000-312991 |
| Feb. 9, 2001 | (JP) | 2001-034537 |
| Jul. 18, 2001 | (JP) | 2001-217893 |

(51) Int. Cl.
*B41J 1/00* (2006.01)
*G03F 3/08* (2006.01)

(52) U.S. Cl. ......... 358/1.9; 358/518; 358/519; 382/167; 345/591; 348/254; 348/675

(58) Field of Classification Search .................. 358/1.9, 358/518, 519; 382/167; 345/590, 591; 348/256, 348/675, 254, 251, 674
See application file for complete search history.

(56) References Cited

U.S. PATENT DOCUMENTS

| 5,982,416 A | 11/1999 | Ishii et al. |
| 6,273,535 B1 | 8/2001 | Inoue et al. |
| 6,282,311 B1 | 8/2001 | McCarthy et al. |
| 6,591,009 B1 | 7/2003 | Usami et al. |
| 6,657,658 B2 | 12/2003 | Takemura |
| 6,867,883 B1 * | 3/2005 | Cholewo et al. ............... 358/1.9 |
| 7,034,842 B1 | 4/2006 | Sato et al. |
| 7,414,633 B2 | 8/2008 | Sato et al. |
| 2002/0027603 A1 * | 3/2002 | Kuwata et al. ............... 348/232 |
| 2002/0039104 A1 | 4/2002 | Sato et al. |

FOREIGN PATENT DOCUMENTS

| GB | 2 328 104 | 2/1999 |
| JP | 06-008537 | 1/1994 |
| JP | 08-088780 | 4/1996 |

(Continued)

OTHER PUBLICATIONS

Abstract of Japanese Patent Publication No. 2000-106626, Pub. Date: Apr. 11, 2000, Patent Abstracts of Japan.

(Continued)

*Primary Examiner* — Thomas D Lee
(74) *Attorney, Agent, or Firm* — Martine Penilla Group, LLP

(57) ABSTRACT

A CPU of a color printer performs gamma correction and a matrix operation M on an RGB color space image data derived by a matrix operation S. Using gamma correction value settings, the CPU performs gamma conversion of image data. Matrix operation M converts the RGB color space to an XYZ color space. When performing matrix operation M, the CPU refers to a PrintMatching tag and performs the matrix operation using a matrix (M) that corresponds to the indicated color space, in order to reflect the color space used for generation of image data.

20 Claims, 14 Drawing Sheets

FOREIGN PATENT DOCUMENTS

| | | |
|---|---|---|
| JP | 09-219817 | 8/1997 |
| JP | 09-238265 | 9/1997 |
| JP | 10-191246 | 7/1998 |
| JP | 11-041480 | 2/1999 |
| JP | 11-041622 | 2/1999 |
| JP | 11-069141 | 3/1999 |
| JP | 11-069187 | 3/1999 |
| JP | 11-88672 | 3/1999 |
| JP | 11-088672 | 3/1999 |
| JP | 11-127415 | 5/1999 |
| JP | 11-146182 | 5/1999 |
| JP | 11-170634 | 6/1999 |
| JP | 11-225269 | 8/1999 |
| JP | 11-282446 | 10/1999 |
| JP | 11-298848 | 10/1999 |
| JP | 11-327605 | 11/1999 |
| JP | 11-331596 | 11/1999 |
| JP | 11-331622 | 11/1999 |
| JP | 2000-013718 | 1/2000 |
| JP | 2000-106626 | 4/2000 |
| JP | 2000-115558 | 4/2000 |
| JP | 2000-137806 | 5/2000 |
| JP | 2000-172832 | 6/2000 |
| JP | 2000-227848 | 8/2000 |
| JP | 2000-278598 | 10/2000 |
| JP | 2001-147481 | 5/2001 |
| WO | WO 92/05652 | 4/1992 |
| WO | WO 96/01467 | 1/1996 |

OTHER PUBLICATIONS

Abstract of Japanese Patent Publication No. 2000-115558, Pub. Date: Apr. 21, 2000, Patent Abstracts of Japan.

Abstract of Japanese Patent Publication No. 06-008537, Pub. Date: Jan. 18, 1994, Patent Abstracts of Japan.

Abstract of Japanese Patent Publication No. 08-088780, Pub. Date: Apr. 2, 1996, Patent Abstracts of Japan.

Abstract of Japanese Patent Publication No. 09-219817, Pub. Date: Aug. 19, 1997, Patent Abstracts of Japan.

Abstract of Japanese Patent Publication No. 10-191246, Pub. Date: Jul. 21, 1998, Patent Abstracts of Japan.

Abstract of Japanese Patent Publication No. 11-041480, Pub. Date: Feb. 12, 1999, Patent Abstracts of Japan.

Abstract of Japanese Patent Publication No. 11-041622, Pub. Date: Feb. 12, 1999, Patent Abstracts of Japan.

Abstract of Japanese Patent Publication No. 11-069141, Pub. Date: Mar. 9, 1999, Patent Abstracts of Japan.

Abstract of Japanese Patent Publication No. 11-069187, Pub. Date: Mar. 9, 1999, Patent Abstracts of Japan.

Abstract of Japanese Patent Publication No. 11-088672, Pub. Date: Mar. 30, 1999, Patent Abstracts of Japan.

Abstract of Japanese Patent Publication No. 11-127415, Pub. Date: May 11, 1999, Patent Abstracts of Japan.

Abstract of Japanese Patent Publication No. 11-170634, Pub. Date: Jun. 29, 1999, Patent Abstracts of Japan.

Abstract of Japanese Patent Publication No. 11-298848, Pub. Date: Oct. 29, 1999, Patent Abstracts of Japan.

Abstract of Japanese Patent Publication No. 11-327605, Pub. Date: Nov. 26, 1999, Patent Abstracts of Japan.

Abstract of Japanese Patent Publication No. 11-331596, Pub. Date: Nov. 30, 1999, Patent Abstracts of Japan.

Abstract of Japanese Patent Publication No. 11-331622, Pub. Date: Nov. 30, 1999, Patent Abstracts of Japan.

Abstract of Japanese Patent Publication No. 2000-013718, Pub. Date: Jan. 14, 2000, Patent Abstracts of Japan.

Abstract of Japanese Patent Publication No. 2000-137806, Pub. Date: May 16, 2000, Patent Abstracts of Japan.

Abstract of Japanese Patent Publication No. 2000-172832, Pub. Date: Jun. 23, 2000, Patent Abstracts of Japan.

Abstract of Japanese Patent Publication No. 2000-227848, Pub. Date: Aug. 15, 2000, Patent Abstracts of Japan.

Abstract of Japanese Patent Publication No. 2000-278598, Pub. Date: Oct. 6, 2000, Patent Abstracts of Japan.

Abstract of Japanese Patent Publication No. 2001-147481, Pub. Date: May 29, 2001, Patent Abstracts of Japan.

Abstract of Japanese Patent Publication No. 09-238265, Pub. Date: Sep. 9, 1997, Patent Abstracts of Japan.

Abstract of Japanese Patent Publication No. 11-146182, Pub. Date: May 28, 1999, Patent Abstracts of Japan.

* cited by examiner

Fig.13

$$\begin{pmatrix} R \\ G \\ B \end{pmatrix} = \mathsf{S} \begin{pmatrix} Y \\ Cb-128 \\ Cr-128 \end{pmatrix}$$

$$\mathsf{S} = \begin{pmatrix} 1 & 0 & 1.40200 \\ 1 & -0.34414 & -0.71414 \\ 1 & 1.77200 & 0 \end{pmatrix}$$

Fig.14

$$\begin{pmatrix} X \\ Y \\ Z \end{pmatrix} = \mathsf{M} \begin{pmatrix} Rt' \\ Gt' \\ Bt' \end{pmatrix} \qquad \mathsf{M} = \begin{pmatrix} 0.6067 & 0.1736 & 0.2001 \\ 0.2988 & 0.5868 & 0.1144 \\ 0 & 0.0661 & 1.1150 \end{pmatrix}$$

$Rt, Gt, Bt \geq 0$ $$Rt' = \left(\frac{Rt}{255}\right)^{\gamma} \qquad Gt' = \left(\frac{Gt}{255}\right)^{\gamma} \qquad Bt' = \left(\frac{Bt}{255}\right)^{\gamma}$$

$Rt, Gt, Bt < 0$ $$Rt' = -\left(\frac{-Rt}{255}\right)^{\gamma} \qquad Gt' = -\left(\frac{-Gt}{255}\right)^{\gamma} \qquad Bt' = -\left(\frac{-Bt}{255}\right)^{\gamma}$$

Fig.15

$$\begin{pmatrix} Rw \\ Gw \\ Bw \end{pmatrix} = \mathbf{N}^{-1} \begin{pmatrix} X \\ Y \\ Z \end{pmatrix}$$

$$\mathbf{N}^{-1} = \begin{pmatrix} 3.30572 & -1.77561 & 0.73649 \\ -1.04911 & 2.1694 & -1.4797 \\ 0.0658289 & -0.241078 & 1.24898 \end{pmatrix}$$

$$Rw' = \left(\frac{Rw}{255}\right)^{1/\tau} \qquad Gw' = \left(\frac{Gw}{255}\right)^{1/\tau} \qquad Bw' = \left(\frac{Bw}{255}\right)^{1/\tau}$$

APPARATUS, METHOD AND COMPUTER PROGRAM PRODUCT FOR PROVIDING OUTPUT IMAGE ADJUSTMENT FOR IMAGE FILES

CROSS-REFERENCE TO RELATED APPLICATION

This application is a continuation of U.S. patent application Ser. No. 09/974,906, filed Oct. 12, 2001, now U.S. Pat. No. 7,330,286 the disclosure of which is incorporated herein by reference.

BACKGROUND OF THE INVENTION

1. Field of the Invention

The present invention relates to apparatuses, methods and computer program product that involve color space conversion processing on image data. More particularly, the present invention relates to apparatuses, methods and computer program product used in, and by, devices such as digital still cameras (DSC), digital video cameras (DVC), scanners, which capture and store images in a first color space, with a recognition that a color space conversion operation will be performed in downstream processing. The invention also relates to the apparatuses, methods and computer program product that perform the downstream processing, perhaps in the output device, such as a printer or display. Thus, the invention also relates to signal processing hardware and software components, including propagated data signals, and presentation devices, such as printers.

2. Discussion of the Background

In recent years there has been growing demand for DSCs, DVCs, scanners, and other devices that handle digital photographic or scanned images in the form of easily manipulated image files. In DSCs and similar devices, digital photographic image data is typically stored in JPEG format files, one of the formats used for compressed image files. In JPEG files, image data is defined using a YCbCr color space so as to enable a high compression ratio. Accordingly, devices such as DSCs translate photographic image data represented in an RGB color space to a YCbCr color space. The RGB color space used by devices such as DSCs is typically a standard color space for personal computer CRT monitors (e.g., sRGB: IEC61966 2-1).

Since personal computers use an RGB color space as the standard color space for image data, a personal computer receiving a JPEG file must decompress the JPEG file and convert the color space of the image data from a YCbCr color space to an RGB color space. Image data that has been converted to an RGB color space is either displayed on a monitor, or is converted to a CMYK color space for print output on a print medium via a printer.

Conventional image processing by personal computers is typically based on an assumption that images will be output on a CRT monitor, so the color space of image data that has been converted from a YCbCr color space to an RGB color space is typically "clipped" during conversion to the sRGB color space, which has color space characteristics adapted to display on CRT monitors, and is standard across personal computers.

Thus, when a JPEG file generated by an image data generating device such as a DSC is decompressed and converted from a YCbCr color space to an RGB color space by a personal computer, color values outside the gamut of the sRGB color space are inevitably rounded, even in cases where the gamut of the RGB color space of the image data exceeds the gamut of the sRGB color space. In such cases, colors that exceed the gamut of the sRGB color space are not reflected in the output image. As a result, the full color reproduction capabilities of an output device is not utilized—even where the reproducible color range of the output device exceeds that of the sRGB color space. Another drawback is a failure to effectively utilize the full color reproduction capabilities of DSCs.

The sRGB color space, which is matched to the color reproduction capabilities of monitors, has been widely adopted as the standard RGB color space, and conventional YCbCr-to-RGB color space conversion currently relies on conversion matrices that have been designed on the assumption that images will be displayed on a monitor. Thus, even if one were to define a new RGB color space having a wider gamut than the sRGB color space, unless one also adopted the new RGB color space as the color space used by all the devices—from the input device to the output device—for image processing, the lack of a common standard would result in an inability to easy modify color space attributes.

Some image file users overcome this problem by performing image file image adjustment using image file correction software that gives output accurately reflecting the native color space of a DSC or other device. However, such image adjustment is rather complicated.

With the foregoing in view, it is an object of the present invention to provide an image output device capable of accurately outputting information indicating the color space used when image data is generated. It is a further object to provide an image output device capable of effectively utilizing the color reproduction range of a device that generates image data, or of a device that outputs image data.

SUMMARY OF THE INVENTION

It is an object of the present invention to solve the above-described and other problems associated with color space conversion processes.

The present invention, in a first aspect thereof, addresses this problem and other problems by providing an image processing apparatus for performing image processing using an image file that includes image data and use information indicating whether out of gamut information for a specific color space is used. The image processing apparatus according to this first aspect includes image file acquisition mechanism for acquiring the image file; decision mechanism for deciding, on the basis of use information contained in the acquired file, whether to use information out of gamut for a specific color space; and image processing mechanism that, if decided to use the out of gamut information, performs image processing of the image data, that includes color conversation to a wide color space having a wide gamut that accommodates the out of gamut information within the gamut thereof.

According to the image processing apparatus of this first aspect, in the event that out of gamut information for a specific color space is used, image processing that includes color conversation to a wide color space having a wide gamut that accommodates the out of gamut information within the gamut thereof is performed, whereby color values include in image data at generation of the image data may be utilized for correct reproduction of the image data.

According to the image processing apparatus of this first aspect, in the event that it is decided not to use the out of gamut information, the image processing apparatus may perform image processing of the image data via a predetermined color space having a gamut equivalent to the specific color space. With this arrangement, image processing can be carried out using predetermined information in the event that it decided not to use out of gamut information.

According to the image processing apparatus of this first aspect, the image data contained in the image file is defined by a first color space; the image file acquisition mechanism converts the color space of the image data contained in the acquired image file from the first color space to a second color space; and the image processing mechanism converts the color space of the image data defined by the second color space to a third color space using the out of gamut values.

With this arrangement, during conversion of image data defined by a second color space to a third color space, out of gamut values are used for the color space conversion, whereby image data may be accurately reproduced using color values contained in image data at generation of the image data.

According to the image processing apparatus of this first aspect, the first color space is a YCbCr color space, the second color space is a first RGB color space, and the third color space is a second RGB color space having a wider gamut than the second color space. The second RGB color space may be the sRGB color space. The third color space may be the CIELAB color space rather than a second RGB color space.

With this arrangement, an image is output using image data that has a second RGB color space wider than the first RGB color space, whereby it is possible to output an image of higher saturation than is the case where image data having the first RGB color space is used. Where the color space of the output data is the CIELAB color space, color matching is facilitated, thus providing an advantage when image processing is performed in yet another device.

According to the image processing apparatus of this first aspect, the image data contained in the image file is represented by a first color space and includes first positive color values lying within the gamut of the specific color space, and/or second positive color values and negative color values lying outside the gamut of the specific color space; and the image file acquisition mechanism uses the first and second positive color values and the negative color values to convert the color space of the image data from the first color space to a second color space. With this arrangement, image processing can be performed so as to reflect first and second positive color values and negative color values in the image data, thereby improving reproduction of the image data in an output device.

According to the image processing apparatus of this first aspect, the image processing mechanism includes a gamma correction mechanism for performing gamma correction of the image data using a first gamma correction value in the event that the image data contains the first and second positive color values, and using a second gamma correction value that differs from the first gamma correction value, in the event that the image data contains negative color values. With this arrangement, appropriate gamma correction can be performed when image data includes positive color values, or includes negative color values.

According to the image processing apparatus of this first aspect, the second gamma correction value may be smaller than the first gamma correction value. This allows negative color values to be utilized effectively to further expand the range of color reproduction of image data.

According to the image processing apparatus of this first aspect, the image processing mechanism converts the image data, represented by the second color space and including the first positive color values, the second positive color values and the negative color values, to a third color space that is wider than the second color space and whose gamut includes the second positive color values and/or the negative color values. This allows second positive color values and/or negative color values that cannot be represented in the second color space to be included in the gamut of the third color space, so that second positive color values and/or negative color values may be reproduced for output. This improves saturation in image data, and affords effective utilization of the color reproduction range of the device generating the image data or the device outputting the image data.

According to the image processing apparatus of this first aspect, the first color space is an RGB color space represented by a R component, a G component, and a B component, and the second gamma correction value includes a second gamma correction value for the R component, a second gamma correction value for the G component, and a second gamma correction value for the B component, the values being mutually different. With this arrangement, gamma correction optimized for respective representation by the R component, G component, and B component can be performed on image data including negative color values.

According to the image processing apparatus of this first aspect, conversion of the color space of the image data from the first color space to the second color space by the image file acquisition mechanism is performed by way of a first matrix operation performed on image data represented by the first color space, and conversion of the color space of the image data from the second color space to the third color space by the image processing mechanism is performed by way of a second matrix operation performed on image data represented by the second color space.

In a second aspect, the invention provides an image processing apparatus for performing image processing with image data that is represented by a first color space and that includes first positive color values lying within the color gamut of a specific color space, and/or second positive color values and negative color values lying outside the color gamut of the specific color space. The image processing apparatus pertaining to this second aspect of the invention includes an image data acquisition mechanism for acquiring the image data; and a color space conversion mechanism for using the first and second positive color values and negative color values to convert the color space of the image data from the first color space to a second color space that is wider than the specific color space and that includes the second positive color values and/or negative color values in the gamut thereof.

According to the image processing apparatus of this second aspect, an image data color space is converted, using first and second positive color values and negative color values, to a second color space whose gamut includes these second positive color values and/or negative color values, whereby color values contained in image data when generated can be utilized for accurate reproduction of the image data.

Like the image processing apparatus pertaining to the first aspect, the image processing apparatus pertaining to this second aspect may be reduced to practice in a number of other embodiments.

The image processing apparatus pertaining to the first or second aspect may further include a printing mechanism for printing the image processed image data onto a print medium. This enables output of image processed image data.

In a third aspect, the invention provides a program for outputting, by way of an image output device, image data using an image file that contains image data and use information indicating whether out of gamut color values for a specific color space are used. The program pertaining to this third aspect executes, by way of a computer, a function for acquiring the image file; a function for deciding, on the basis of the use information contained in the acquired image file, whether to use color values that are out of gamut of the specific color space; a function whereby, in the event that it is decided to use the out of gamut color values, image processing of the image data is performed via a color space having a wide gamut that accommodates the out of gamut color values within the gamut thereof; and a function for outputting the image processed image data.

According to the program pertaining to this third aspect, there are afforded working effects analogous to those of the image processing apparatus of the first aspect. Like the image processing apparatus pertaining to the first aspect, the program pertaining to this third aspect may be reduced to practice in a number of different embodiments.

In a fourth aspect, the invention provides a device for generating an image file that contains image data and image processing control information indicating image processing conditions for image data. The image file generating device pertaining to this fourth aspect includes an image data acquisition mechanism for acquiring the image data; an image processing control information generation mechanism for generating the image processing control information, including use information that indicates whether out of gamut information for a specific color space is used for image processing of the image data; and an image file generation mechanism for generating an image file that contains the acquired image data and the generated image processing control information.

According to the image file generating device pertaining to this fourth aspect, it is possible to generate an image file that includes acquired image data and image processing control information that includes use information indicating whether out of gamut information for a specific color space is used, thereby enabling image processing of image data utilizing out of gamut information.

In a fifth aspect, the invention provides a device for generating an image file that contains image data and image processing control information indicating image processing conditions for image data. The image file generating device pertaining to this fifth aspect includes an image data generation mechanism for generating image data that includes first positive color values lying within the gamut of a specific color space, and/or second positive color values and negative color values lying outside the gamut of the specific color space; and an image processing control information generation mechanism for generating image processing control information that includes use information indicating whether the second positive color values and/or negative color values are used during image processing of the image data, a first gamma correction value for use where the image data contains the first and second positive color values, and a second gamma correction value, different from the first gamma correction value, for use where the image data contains negative color values.

According to the image file generating device pertaining to this fifth aspect, it is possible to generate an image file containing acquired image data and use information indicating whether second positive color values and/negative color values lying outside the gamut of a specific color space, enabling image processing of image data utilizing these second positive color values and/or negative color values.

In the image file generating device pertaining to this fifth aspect, the image processing control information may further include color space conversion characteristics for performing color space conversion of the image data, for conversion thereof to a color space that is wider than the specific color space and that includes the second color values and/or the negative color values in the gamut thereof.

In a sixth aspect, the invention provides a method for outputting image data using image data represented by a first color space and use information indicating whether information out of the gamut of a specific color space is used. The method pertaining to this sixth aspect includes the steps of acquiring the image data and converting the color space of the acquired image data from the first color space to the second color space; deciding from the use information whether the out of gamut information is used; in the event that it is decided to use the out of gamut information, using the out of gamut information to convert the color space of image data represented by the second color space to the third color space; and outputting the converted image data.

The method pertaining to the sixth aspect of the invention affords working effects analogous to the image processing apparatus of the first aspect of the invention. Like the image processing apparatus of the first aspect of the invention, the method pertaining to the sixth aspect of the invention may be reduced to practice in a number of different embodiments.

In a seventh aspect, the invention provides a method for outputting image data. The method pertaining to this seventh aspect includes the steps of acquiring the image data represented by a first color space and converting the color space of the acquired data from the first color space to a second color space; holding information relating to the second color space resulting from the conversion, and information out of gamut of the second color space; converting image data represented by the second color space to a third color space so as to reflect the held information; and outputting the converted image data.

The method pertaining to the seventh aspect of the invention affords working effects analogous to the image processing apparatus of the first aspect of the invention. Like the image processing apparatus of the first aspect of the invention, the method pertaining to the seventh aspect of the invention may be reduced to practice in a number of different embodiments.

In an eighth aspect, the invention provides an image processing method for image data. The image processing method pertaining to this eighth aspect includes the steps of acquiring image data based on a first color space and converting the color space of the acquired image data from the first color space to the second color space; for the converted image data, holding in-gamut and out of gamut information of the second color space; and converting the color space of the image data represented by the second color space to a third color space having a wider gamut than the second color space so as to reflect the full content of the information held.

The method pertaining to the eighth aspect of the invention affords working effects analogous to the image processing apparatus of the second aspect of the invention. Like the image processing apparatus of the second aspect of the invention, the method pertaining to the eighth aspect of the invention may be reduced to practice in a number of different embodiments.

In a ninth aspect, the invention provides an image processing apparatus for performing image processing on image data. The image processing apparatus of the ninth aspect comprises means for acquiring the image data, wherein the image data contains out of gamut information for a predetermined color space, means for instructing use of the out of gamut information for said predetermined color space, and means for performing image processing on said image data, wherein the image processing includes means for performing color conversion of said out of gamut information to a wide gamut color space when use of the out of gamut information is instructed, wherein a gamut of the wide gamut color space is sufficiently large to accommodate the image data associated with the out of gamut information.

According to the image processing apparatus of this ninth aspect, in the event that the use of out of gamut information for a specific color space is instructed, image processing that includes color conversation to a wide color space having a wide gamut that accommodates the out of gamut information within the gamut thereof is performed, whereby color values include in image data at generation of the image data may be utilized for correct reproduction of the image data.

In the ninth aspect, wherein the means for performing color conversion performs image processing the image data via a pre-established color space having a gamut equivalent to that of the predetermined color space when use of the out of gamut information is not instructed.

An image processing apparatus for performing image processing on image data may comprises means for acquiring an image data, and means for performing image processing on said image data with the out of gamut information for said predetermined color space contained in the image data. With this image apparatus, the image processing is performed with the out of gamut information for said predetermined color space. Therefore, a saturation of the image processed data is improved.

The image processing may include means for performing color conversion of said out of gamut information to a wide gamut color space, wherein a gamut of the wide gamut color space is sufficiently large to accommodate the image data associated with the out of gamut information. In this ninth aspect, the out of gamut information for said predetermined color space is reproduced in the wide gamut color space, then a saturation of the image processed image data is improved. The out of gamut information for said predetermined color space may be negative color data values, a gamma correction value for the negative color data values and a gamma correction value for positive color data values may be different. In this arrangement, gamma corrections suitable for a gradient of the positive color data values and for a gradient of the negative color data values are performed, respectively.

BRIEF DESCRIPTION OF THE DRAWINGS

FIGS. 13-15 are descriptions of mathematical expressions used for describing conversion processes performed as part of the present invention.

DESCRIPTION OF THE PREFERRED EMBODIMENTS

Figure 1:
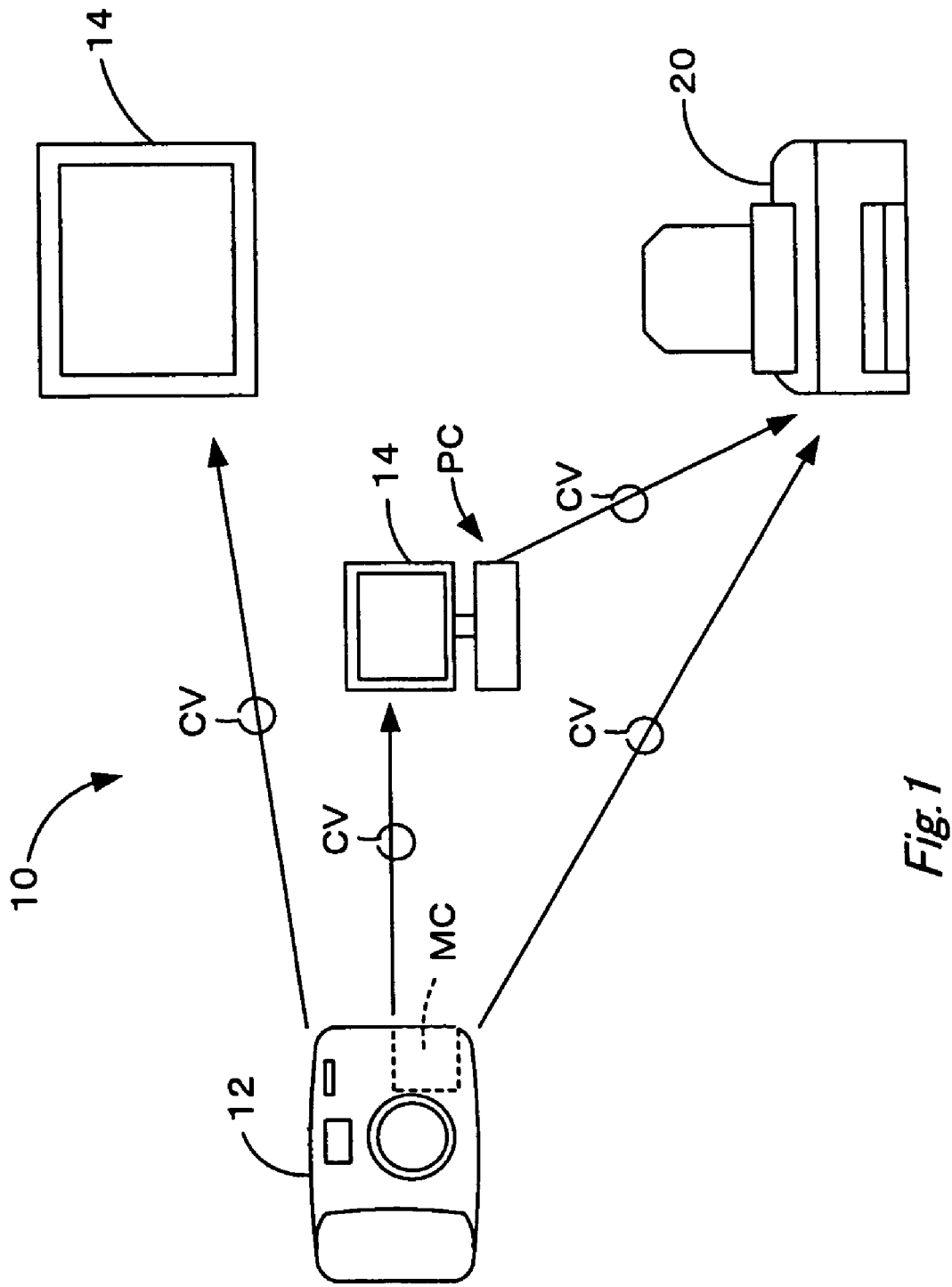
FIG. 1 is an illustrative diagram of an exemplary image data output system in which the image output device of the first embodiment may be implemented.
Figure 2:
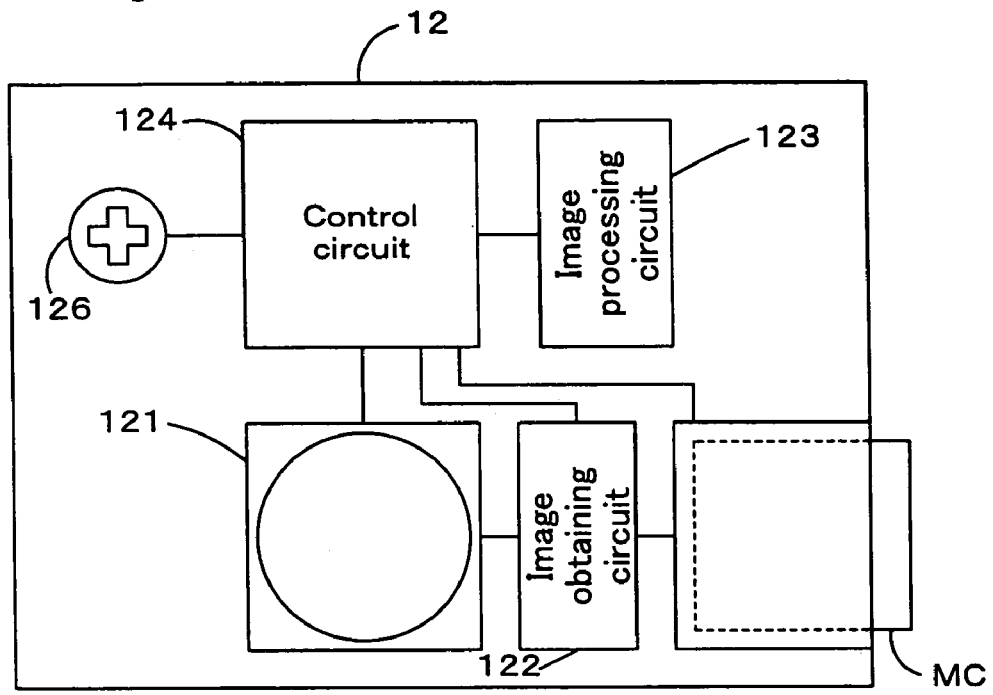
FIG. 2 is a block diagram showing a simplified arrangement for a digital still camera capable of generating an image file (image data) for output by the image output device of the first embodiment.

A more complete understanding of the present invention will be gained through the following description of the embodiments in the order indicated below, making reference to the accompanying drawings.
A. Arrangement of image data output system including image output device
B. Arrangement of image output device
C. Image processing in image output device
D. Other embodiments A. Arrangement of Image Data Output System Including Image Output Device The following description of the arrangement of an image data output system in which the image processing apparatus of the first embodiment may be implemented makes reference to FIGS. 1 and 2. FIG. 1 is an illustrative diagram of an exemplary image data output system in which the image processing apparatus of the first embodiment may be implemented. FIG. 2 is a block diagram showing a simplified arrangement for a digital still camera capable of generating an image file (image data) for output by the image processing apparatus of the first embodiment.

Image data output system 10 includes a digital still camera 12 serving as an input device for generating image files; and a color printer 20 serving as an output device for performing image processing of image files generated by digital still camera 12, and outputting the resultant images. Besides a printer 20, the output device could be a monitor 14 (e.g. an CRT display, LCD display etc.), a projector, or the like; however in the following description the output device is assumed to be a color printer 20.

The DSC 12 may also include an I/O port, such as a USB, IEEE 1394 port, or a wireless port, such as IR or RF, (e.g., Bluetooth compatible). When a "wired" communication channel is used (CV), such a coaxial cable, USB cable, or CAT 5 cable, for outputting the resulting image file, the propagated data signal is sent over the channel as an electric signal. When transmitted over a wireless channel, the propagated data signal is sent as an electromagnetic signal. As a data structure format for saving the image data (GD) in DSC 12, a JPEG format is typical, but it is also possible to use other file formats such as TIFF, GIF, BMP, and RAW.

Digital still camera 12 acquires images by way of imaging optical information with a digital device (e.g. a CCD or photomultiplier); as shown in FIG. 2 it includes an optical circuit 121 for gathering optical information; an image acquisition circuit 122 for controlling the digital device in order to acquire an image; an image processing circuit 123 for processing the acquired digital image; and a control circuit 124 for controlling the various circuits. The digital still camera 12 stores the acquired image as digital data in a memory device, namely, a memory card MC. Alternatively, the image data is stored in semiconductor memory installed in the DSC 12, and then transmitted via a communication channel to an output device, or an intermediate processing device (such as a PC) prior to being delivered to the output device (such as a printer). The format for storing image data in a digital still camera 12 is typically the JPEG format, but other storage formats could be employed, such as TIFF, GIF, BMP, or RAW format. The digital still camera 12 is provided with a Select/Set button 126 for selecting and setting various functions.

Digital images generated by digital still camera 12 are defined by an RGB color space. Most typically, the RGB color space will be the sRGB color space, but the NTSC-RGB color space, which has a wider gamut than the sRGB color space, may be selected as well. For storage on the memory card MC, data represented by the RGB color space is converted to a YCbCr color space, which has color space characteristics suited to the JPEG format, the format in which the data will be compressed and stored. To store image data in JPEG format, image data represented in an RGB color space is subjected to an inverse matrix operation with a matrix S, described later, to convert the image data color space from an RGB color space, e.g. the sRGB color space, to a YCbCr color space. During conversion from the sRGB color space to the YCbCr color space, color values lying outside the gamut of the sRGB color space, namely, color data having negative values, are also allowed for conversion. This would not be the case if standard processing techniques were used because the negative values would simply be converted, thus loosing the inherent information contained in these negative values.

The digital still camera 12 employed in this image data output system 10 attaches image processing control information GI to the image data in the image file stored in the memory card MC. To retain exchangeability of image files, the image file generated by digital still camera 12 typically has a file structure in accordance with the format specified for digital still camera image files (Exif). The Exif specification was developed by the Japan Electronics and Information Technologies Industries Association (JEITA).

Figure 3:
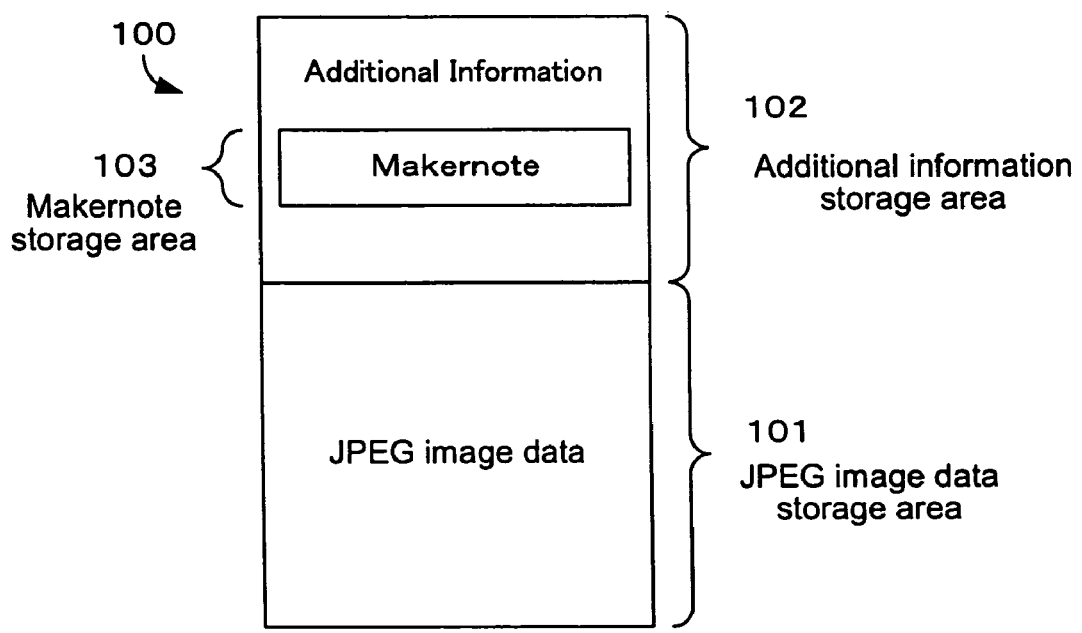
FIG. 3 is an illustrative diagram showing the general internal structure of an image file GF stored in the Exif file format.

The following description of general structure of an image file having a file format in accordance with the Exif file format makes reference to FIG. 3. FIG. 3 is an illustrative diagram showing the general internal structure of an image file GF stored in the Exif file format. The terms "file structure," "data structure," and "storage area" in this working example mean a file or data field configured to hold a digital representation of an image when a file or data, etc. is stored within a certain storage range of a storage device.

The Exif file, i.e. image file GF, contains a JPEG image data storage area 101 for storing image data in JPEG format, and an extra data storage area 102 for storing extra data of various kinds relating to the stored JPEG image data. The extra data storage area 112 contains, in TIFF format, photographic information relating to photographic parameters when the JPEG image was taken (e.g. date, exposure, shutter speed, etc.), and thumbnail image data for JPEG images stored in JPEG image data storage area 101. When image data is written to the memory card MC, this extra information is automatically stored in the extra data storage area 102. The extra data storage area 102 is also provided with a Makernote data storage area 103, an undefined area currently left available for use by DSC manufacturers. The Makernote data storage area 103 can be used by DSC manufacturers to store any desired information. It is common knowledge to practitioners of the art that the Exif format uses tags to identify data of various kinds.

The Makernote data storage area 103 is also provided with an arrangement whereby stored data can be identified by way of tags. In the present embodiment there is stored image processing control information, GI, for control of image processing in color printer 20. The image processing control information may be set by a DSC manufacturer through a trial and error process of matching the operational characteristics associated with a particular model of DSC, with the operational characteristics of a particular model of printer. This combination of characteristics, embodied in the parameters, ensures that an image output by a printer will be faithful to the image intended to be captured by the photographer.

Image processing control information GI consists of information designating image output parameters for producing optimal output results with reference to the color reproduction capabilities and image output capabilities of color printer 20 or other output device. Information stored as image processing control information GI includes parameters relating to gamma values and to the target color space, and parameters relating whether negative values are used and to contrast, color balance adjustment, sharpness, and color correction. Of these, parameters relating to gamma values, color space, and whether negative values are used represent information whose principal purpose is faithful reproduction of the color characteristics of a subject, while the other parameters represent information whose principal purpose is to produce the desired color reproduction. Negative values are color values that exceed the gamut of a specific RGB color space (in the present embodiment, the sRGB color space), and refer specifically to negative values and positive values exceeding 256. A more detailed description of negative values is provided later.

An image file GF generated by digital still camera 12 is sent to a color printer 20 via a cable CV (or wireless channel) and a computer PC, or simply via a cable CV (or wireless channel). Alternatively, image files may be sent to color printer 20 via a computer PC connected to a memory card MC installed in digital still camera 12, or by directly connecting memory card MC to printer 20. The following description assumes direction connection of memory card MC to color printer 20. Once again, as an alternative to the wired connections, wireless communications may be used as well for transferring the image data file, including the image data and control information stored in the Makernote portion of the Exif file.

B. Arrangement of Image Output Device

Figure 4:
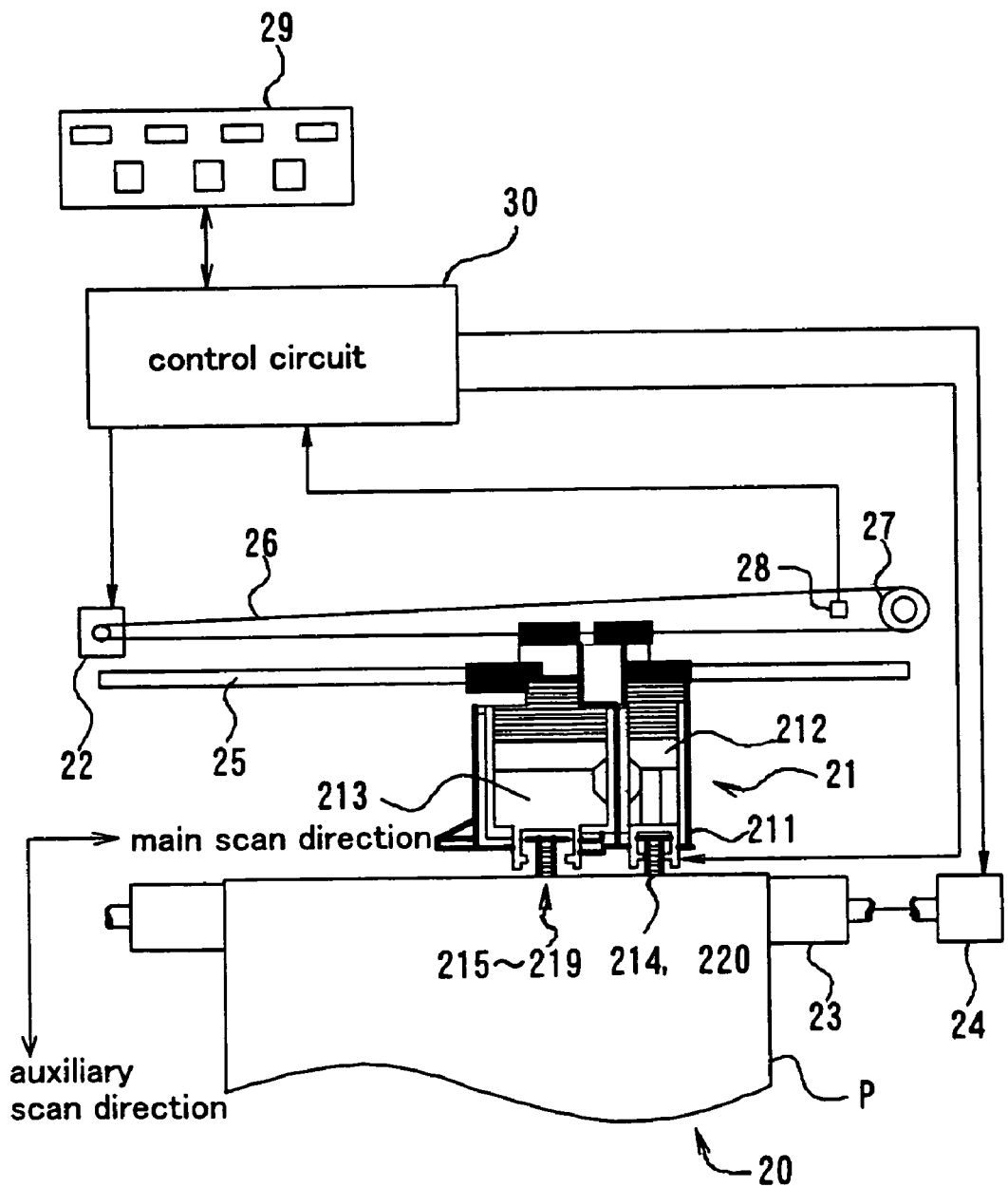
FIG. 4 is a block diagram showing the general arrangement of the color printer pertaining to the first embodiment.

The following description of the general arrangement of the image output device pertaining to the first embodiment, namely, color printer 20, makes reference to FIG. 4. FIG. 4 is a block diagram showing the general arrangement of components internal to the color printer 20 pertaining to the first embodiment.

Color printer 20 is capable of color image output, for example, an ink-jet printer that forms images by jetting inks of four colors—for example, cyan (C), magenta (M), yellow (Y) and black (K)—onto a print medium to produce a dot pattern. An electrophotographic printer that produces images by transferring and fixing color toner onto a print medium. Besides the four colors listed above, light cyan (LC), light magenta (LM), or dark yellow (DY) may also be used.

As shown in FIG. 4, color printer 20 includes a mechanism for driving a print head 211 conveyed on a carriage 21 as it projects ink to produce dots; a mechanism for producing, by way of a carriage motor 22, reciprocating motion of carriage 21 in the axial direction of a platen 23; a mechanism for advancing the printer paper P by way of a paper feed motor 24; and a control circuit 30. The mechanism for producing reciprocal motion of carriage 21 in the axial direction of platen 23 includes a slide rail 25 extending parallel to the axis of platen 23, for slidably retaining cartridge 21; a pulley 27 having an endless drive belt 26 operating between it and carriage motor 22; and a position sensor 28 for sensing the home position of carriage 21. The mechanism for advancing printer paper P includes a platen 23; a paper feed motor 24 for turning platen 23; an auxiliary paper feed roller (not shown), and a gear train (not shown) for transmitting the rotation of paper feed motor 24 to platen 23 and the auxiliary paper feed roller.

Control circuit 30 exchanges signals with the control panel 29 of the printer for optimal control of the operation of paper feed motor 24, carriage motor 22, and print head 211. Printer paper P supplied to color printer 20 is arranged so as to be drawn between platen 23 and the auxiliary paper feed roller, and is advanced in predetermined increments depending on the angle of rotation of platen 23.

An ink cartridge 212 and ink cartridge 213 are installed on carriage 21. Ink cartridge 212 contains black (K) ink, while ink cartridge 213 contains other inks, specifically, inks of the three colors, cyan (C), magenta (M), yellow (Y), plus light cyan (LC), light magenta (LM), or dark yellow (DY), for a total of six color inks.

Figure 5:
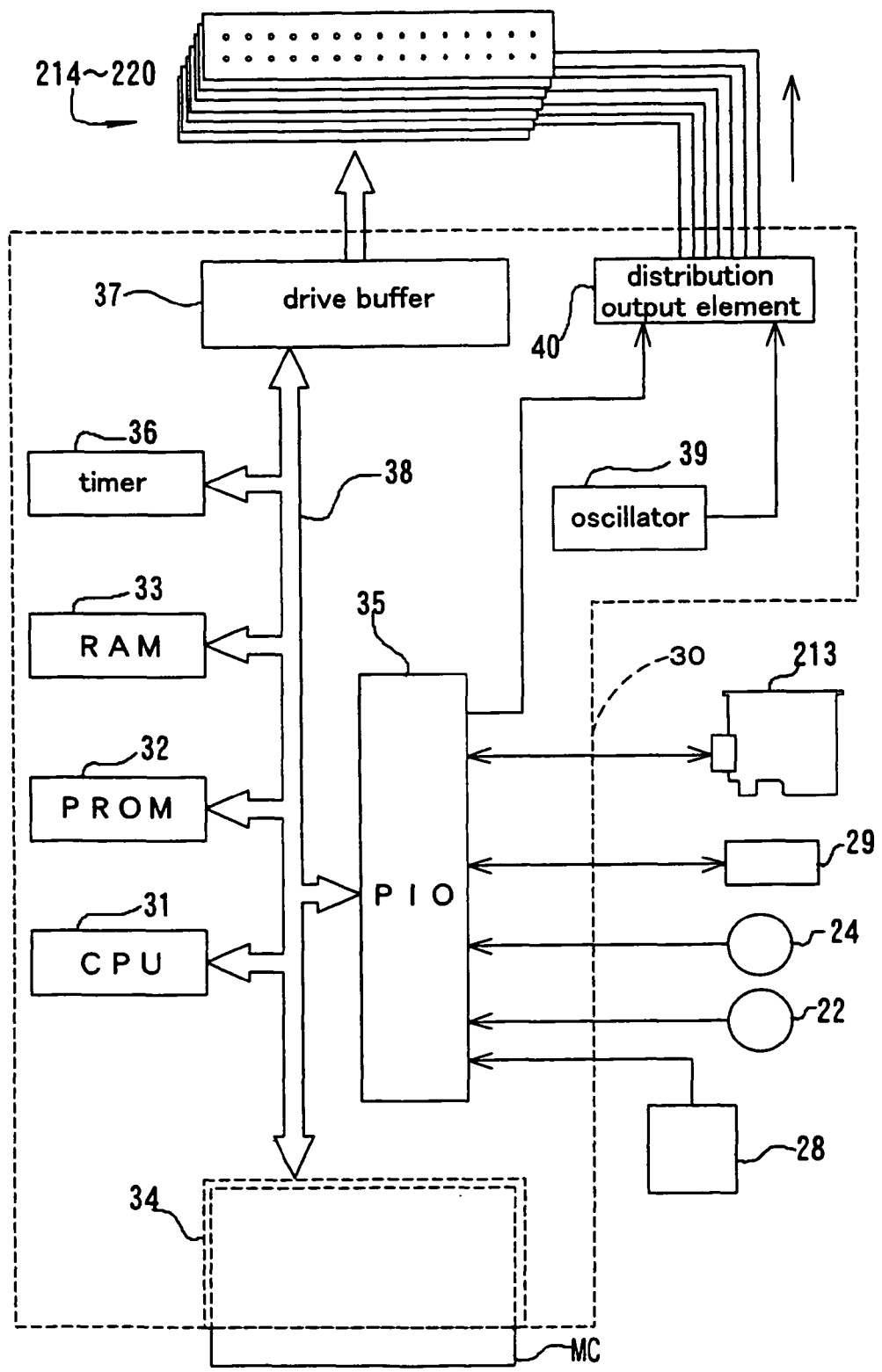
FIG. 5 is an illustrative diagram showing the internal arrangement of a control circuit of the color printer.

The internal arrangement of control circuit 30 of color printer 20 is now described with reference to FIG. 5. FIG. 5 is an illustrative diagram showing the internal arrangement of control circuit 30 of color printer 20. As shown in the drawing, control circuit 30 includes a CPU 31, PROM 32, RAM 33, a PCMCIA slot 34 for data interface with a memory card MC, a peripheral I/O portion (PIO) 35 for data interface with paper feed motor 24, carriage motor 22 etc., a timer 36, a drive buffer 37 etc. An I/O controller 3100 also connects to the other components via the PIO 35. The I/O controller 3100 is configured to exchange digital data (such as an Exif file) with external devices. The I/O controller 3100 operates with both wired and wireless I/O devices. Drive buffer 37 is used as a buffer for supplying dot ON/OFF signals to ink jet heads 214-220. These are interconnected by way of a bus 38 to enable data interface between them. Control circuit 30 additionally includes an oscillator 39 for outputting a drive waveform at a predetermined frequency, and a distributed output element 40 for distributing the output of oscillator 39 to ink jet heads 214-220 under a predetermined timing arrangement.

Control circuit 30 reads out an image file GF from memory card MC, analyzes the image processing control information GI, and performs image processing on the basis of the analyzed image processing control information GI. Control circuit 30 outputs dot data to drive buffer 37 under a predetermined timing arrangement synchronized with operation of the paper feed motor 24 and carriage motor 22. The specifics of the image processing performed by control circuit 30 are discussed later.

C. Image Processing in Image Output Device

Figure 6:
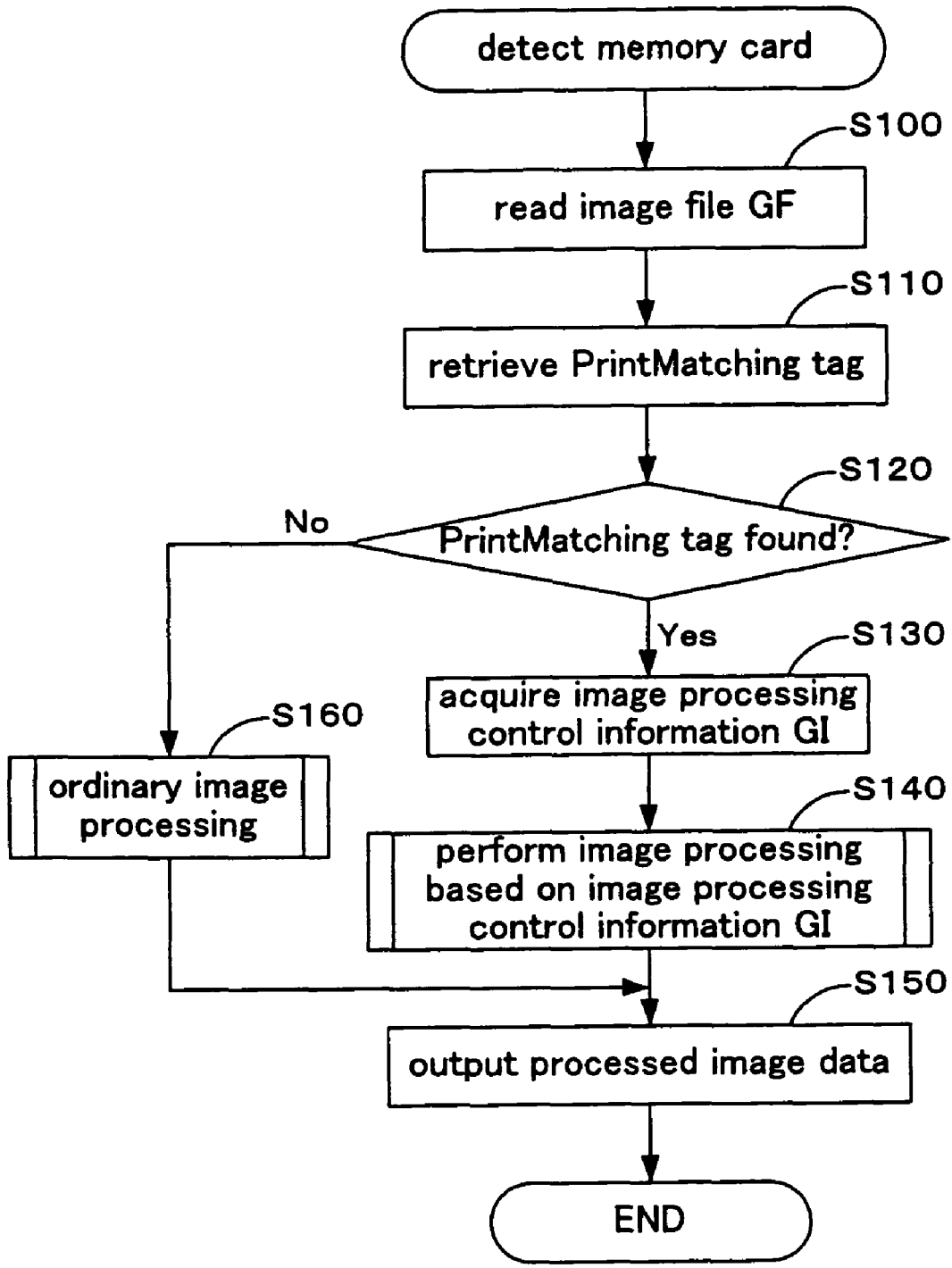
FIG. 6 is a flow chart showing the processing routine for the printing process of the color printer pertaining to the first embodiment.
Figure 7:
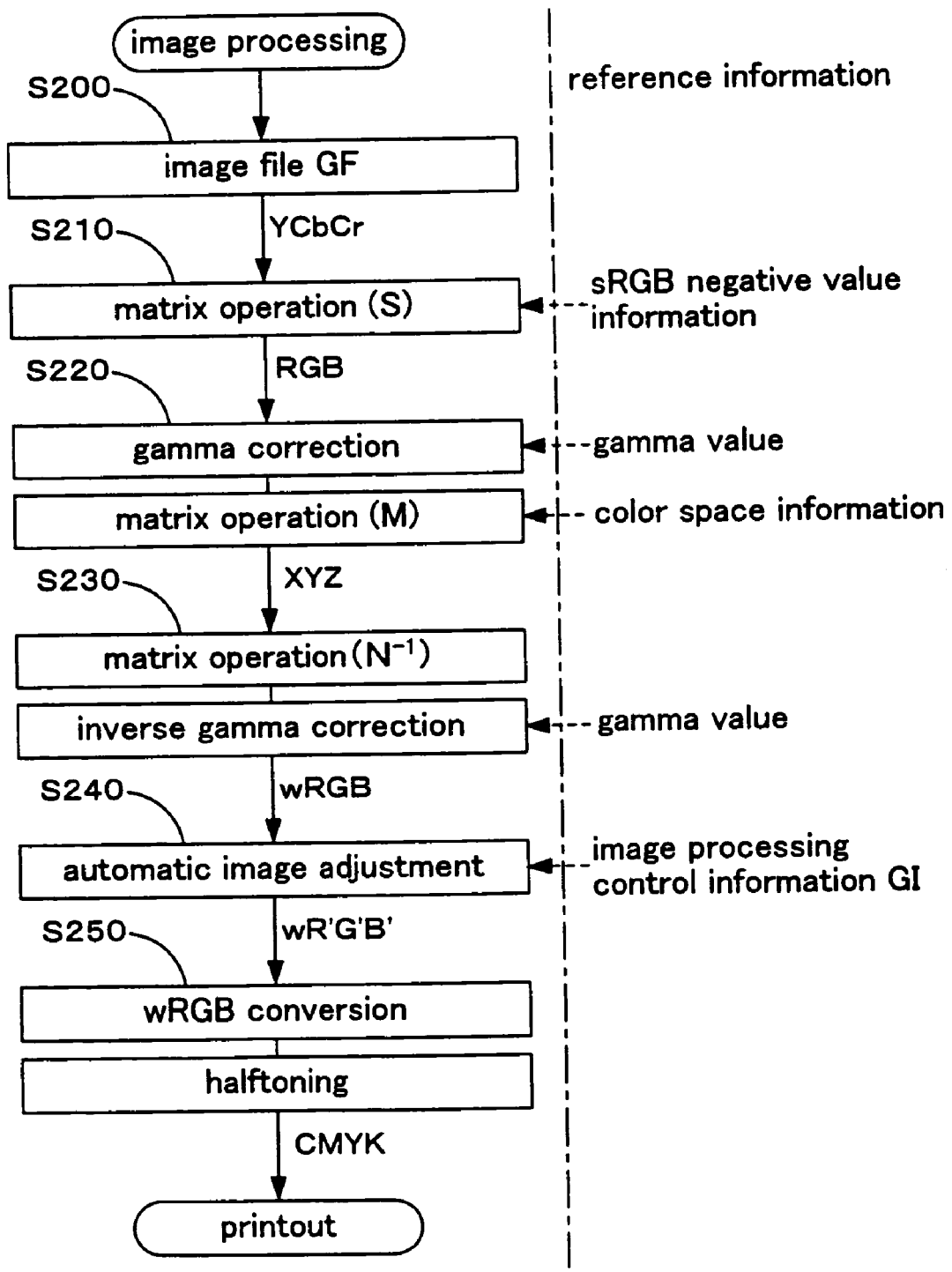
FIG. 7 is a flow chart showing the flow of image processing in the color printer pertaining to the first embodiment.

Image processing in the color printer 20 pertaining to the first embodiment is now described with reference to FIGS. 6 and 7. FIG. 6 is a flow chart showing the processing routine for the printing process of color printer 20 pertaining to the first embodiment. FIG. 7 is a flow chart showing the flow of image processing in color printer 20.

When a memory card MC is inserted in slot 34, (or alternatively an Exif file is received through I/O controller 3100) the control circuit 30 (CPU 31) of printer 20 reads out an image file GF from memory card MC, and temporarily places the image file GF in RAM 33 (STEP S100). From the extra data storage area 102 of image file GF CPU 31 searches for a PrintMatching tag indicating image processing control information for use during image processing of the image data (STEP S110). If CPU 31 has successfully retrieved the PrintMatching tag (STEP S120: Yes), it acquires and analyzes color space information for use during image processing (STEP S130). CPU 31 then executes image processing on the basis of the analyzed color space information, that is the whether the negative color values to be used (described in detail later) (STEP S140) and prints out the processed image data (STEP S150).

If CPU 31 has not successfully retrieved a PrintMatching tag (STEP S120: No), it acquires from ROM 32 default color space information stored in color printer 20, for example, sRGB color space information, and executes image processing in the usual manner (STEP S160). CPU 31 then prints out the processed image data (STEP 150) and terminates the main processing routine.

Image processing in color printer 20 is now described in greater detail with reference to FIG. 7. The control circuit 30 (CPU 31) of color printer 20 extracts image data GD from image file GF (STEP S200). As noted, digital still camera 12 stores image data as JPEG format files; to increase the compression ratio, image data in JPEG files is converted from the color space of the generated data (the sRGB color space) into a YCbCr color space for storage.

However, as personal computers, printers and other devices typically handle only image data represented in an RGB color space, image data represented in an YCbCr color space must be converted to an RGB color space.

CPU 31 performs a 3×3 matrix operation S to convert YCbCr image data to RGB image data (STEP S210). Matrix operation S is an operation defined in the JPEG File Interchange Format (JFIF) specification for converting image data color space from a YCbCr color space to an RGB color space, and is given by the equation illustrated in FIG. 13.

When performing matrix operation S, the converted RGB color space image data may in some instances include second positive color values that are out of gamut with respect to first positive color values representing the gamut of a specific RGB color space (e.g. the sRGB color space), or include negative color values that assume negative values in the RGB color space. In the present embodiment, image processing control information GI indicates whether such second positive color values or negative color values are used. Here, the sRGB color space is defined as the standard color space of the monitor, as is typical in operating systems (OS) which assume image data output on a monitor. RGB components for the gamut of the sRGB color space are assigned 8-bit data capacity. Thus, in conventional practice color values exceeding the gamut of the sRGB color space are "clipped," i.e. rounded, to within the gamut of the sRGB color space.

While digital camera 12 is typically considered to use the sRGB color space, the definition of the sRGB color space may not be followed strictly. Accordingly, when the color space of image data GD is converted by way of matrix operation S to the RGB color space used by digital camera 12, there may be values that exceed the gamut of the sRGB color space.

In the present embodiment, when use of the negative color values is designated by the image processing control information, image processing is performed without rounding of values that exceed the gamut of the sRGB color space. Where RGB color space image data resulting from a conversion includes second positive color values or negative color values, CPU 31 allows these second positive color values and negative color values, without clipping (i.e., rounding) them to the gamut of the sRGB color space, and stores these together with the first positive color values. Accordingly, if image data GD contains second positive color values or negative color values, image data GD is represented in an RGB color space (namely, the RGB color space used by digital still camera 12) having a wider gamut than the sRGB color space. Since image data GD includes color values outside the gamut of the sRGB color space gamut, data capacity will exceed 8 bits.

Figure 8:
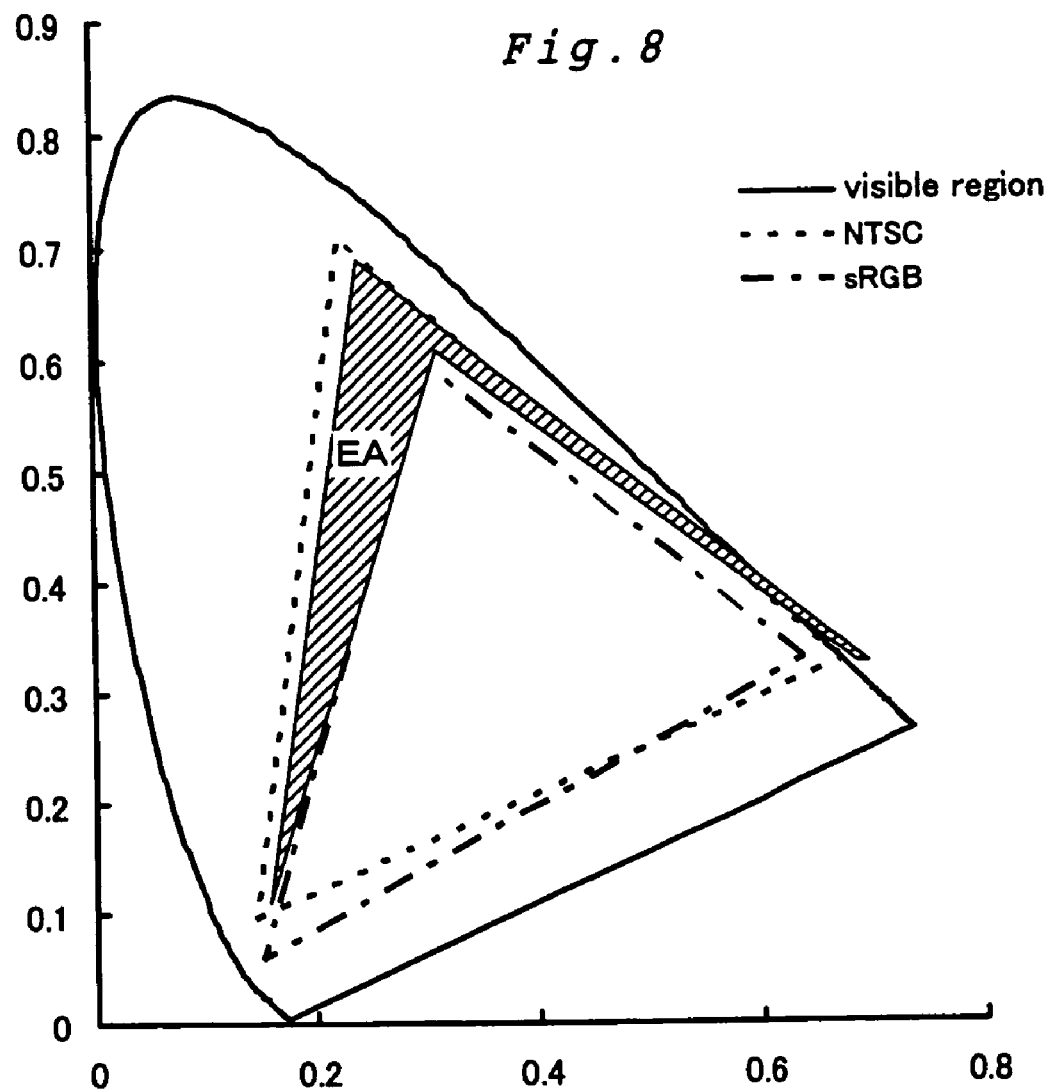
FIG. 8 is an illustrative diagram showing a two-dimensional representation of color space gamuts, illustrating the significance of allowing image data in an extended area (EA) of an RGB color space.

Images in which negative values are allowed are described with reference to FIG. 8. FIG. 8 is an illustrative diagram showing a two-dimensional representation of color space gamuts, illustrating the significance of allowing image data values in an extended area (EA) outside the gamut of the sRGB color space. In the process of allowing negative values in the present embodiment, image data possesses not only RGB color space in-gamut data values, but also data values in an extended area (EA) outside the gamut of the RGB color space, shown in FIG. 8. In the example in FIG. 8, extended area image data generated in the NTSC RGB color space is shown; however, the color space for image data generation is not limited thereto. When the R, G and B components are plotted on coordinate axes, the RGB color space gamut is represented by coordinates (R, G, B); the case of image data including second positive color values and negative color values herein refers to a case wherein any one or more of the (R, G, B) components assumes second positive color values and negative color values.

In the sRGB color space, image data is represented in 256 gradations (8-bit) for each of the R, G and B components. Thus, the range for first positive color values are typically represented by integers 0-255. The second positive color value range is represented by integers of 256 and higher, and the negative value range by integers of −1 and smaller.

Inclusion of second positive color values and negative color values in addition to first positive color values in converted RGB color space image data—as contrasted with the sRGB color space—refers to the use of a color space wider than the sRGB color space by the digital still camera 12 when generating image data, as described previously in reference to FIG. 8, for example. As noted, the sRGB color space has color space characteristics optimized for the color characteristics of CRT displays, and it is known that [sRGB] is typically incapable of adequately representing color spaces used for photography by digital still cameras 12 or for printing by printers.

Accordingly, while such second positive color values and negative color values cannot be represented in the sRGB color space, they can in some instances be represented by further transformation to an RGB color space having a wider gamut than the sRGB color space, or to an RGB color space whose gamut can accommodate the second positive color values and/or negative color values. Accordingly, the color printer 20 herein allows and keeps all information in image data that has been converted from a YCbCr color space to an RGB color space, including any second positive color values and negative color values. Of course, in the event that data values outside the gamut of the sRGB color space have been rounded during generation of image data by a digital camera 12, not even matrix operation S will give second positive color values and negative color values.

CPU 31 performs gamma correction and a matrix operation M on the RGB color space image data obtained in the preceding manner (STEP S220). Here, processing is performed in accordance with color space information in the image processing control information GI. During gamma correction, CPU 31 refers to the gamma value included in the parameters described earlier, and uses the set gamma value (native DSC value) for gamma conversion of image data.

Figure 9:
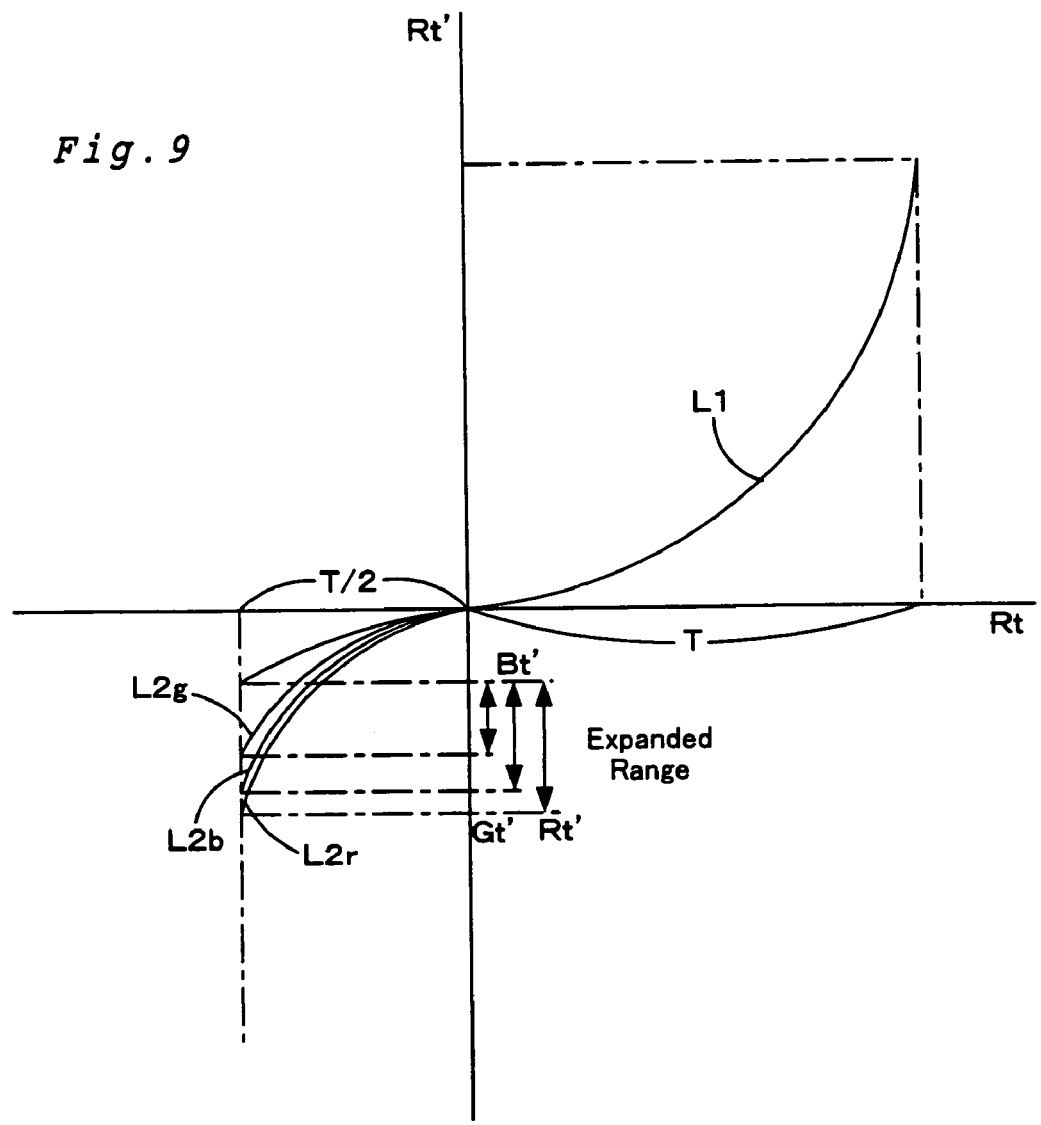
FIG. 9 is an illustrative diagram showing an exemplary first gamma curve L1 corresponding to first gamma correction values γ1 and second gamma curves L2r, L2g and L2b corresponding to second gamma correction values γ2r, γ2g, γ2b, for use in gamma correction.

During gamma correction, where image processing control information GI specifies the use of negative values, in the range in which the image data assumes first and second color values, as shown in FIG. 9 CPU 31 uses a first gamma correction value γ1 (set gamma value), and in the range in which the image data assumes negative values it uses a second gamma correction value γ2 smaller than the a first gamma correction value γ1. The second gamma correction value γ2 is further divided into a R component γ2r, a G component γ2g, and a B component γ2b. FIG. 9 is an illustrative diagram showing an exemplary first gamma curve L1 corresponding to first gamma correction values γ1 and second gamma curves L2r, L2g and L2b corresponding to second gamma correction values γ2r, γ2g, γ2b for use in gamma correction. To facilitate the description, with the exception of second gamma curve L2, a representative R component is taken as an example. First gamma curve L1, as regards the R component, is expressed as $Rt'=(Rt)^{\gamma 1}$, and second gamma curve L2 is expressed as $Rt'=-(-Rt)^{\gamma 2r}$.

Typically, the YCbCr color space and RGB color space are associated by way of the following equation using a matrix operation S, and thus where image data represented in the YCbCr color space color system (0~Y~255, −128~Cb~127, −128~Cr~127) is represented in the RGB color space color system, the R, G and B components positive color value range T is guaranteed to have the range 0~255, while the negative color value range T/2, which has no predefined representation, tends to be narrower than the positive color value range T. Thus, if the same gamma correction value γ1 used for positive color values were used as the gamma correction value for negative color values, the negative color value range R'1 subsequent to gamma correction will inevitably be smaller than the negative color value range R1 prior to gamma correction, as shown in FIG. 9, which does not allow effective use of the negative color values that one has deliberately set about to utilize. Under such conditions, by using a different, second gamma correction value γ2 (1.5. for example) smaller than the first gamma correction value γ1 (2.2 for example) for positive color values as the gamma correction value γ for negative color values in order to maintain in the XYZ color space a wide color space given by negative color values for the R, G and B components, the gamma-converted (compensated) ranges Rt', Ct' and Bt' can be expanded.

That is, when a photographic image is taken, by using a different gamma correction value—smaller than that for positive color values—as the gamma correction value for negative color values, and using these respective gamma correction values during output of the image data as well, it becomes possible to represent image data in a wider range, thereby improving saturation in output image data and reproducing the actual vivid colors of the subject.

Where gamma correction value γ>1.0, the slope at the origin is 0, and the first gamma curve L1 and second gamma curve L2r connect smoothly at the joint (origin). As a result, there is afforded image data (image output) having smooth gradation change free from gradation jumps resulting from the joint of the first gamma curve L1 and second gamma curve L2r.

Since the R, G and B components can assume different negative color value ranges, second gamma correction values γ2 may be varied depending on the size of the color value range of the RGB components. As will be apparent from FIG.

10, discussed later, if the negative color value ranges expand to larger size in the order R component>B component>G component, for example, then second gamma correction values γ2 may be increased in the order R component second gamma correction value γ2r<B component second gamma correction value γ2b>G component second gamma correction value γ2g, as shown in FIG. 9. In this case, by performing appropriate gamma correction within expandable color value ranges, the negative color values ranges can be utilized effectively. As a result, image data can be represented in a wider range, improving the saturation of output image data.

Matrix operation M is an operation for converting an RGB color space to an XYZ color space. When performing matrix operation M, to reflect the color space at image data generation, CPU 31 refers to a Color Space tag, and performs the matrix operation using the matrix (M) that corresponds to the color space indicated thereby. The sRGB color space or NTSC color space may be used at this time. The reason for reflecting color space information indicated in the Color Space tag via the XYZ color space is that the XYZ color space is an absolute color space, and is moreover device-independent, not being dependent on a particular device such as a DSC or printer. By making it such that during color space interchange as well, the same values are always assumed at XYZ color space level, color matching can be accomplished in a device-independent manner. Matrix operation M is given by the equation shown in FIG. 14.

Figure 10:
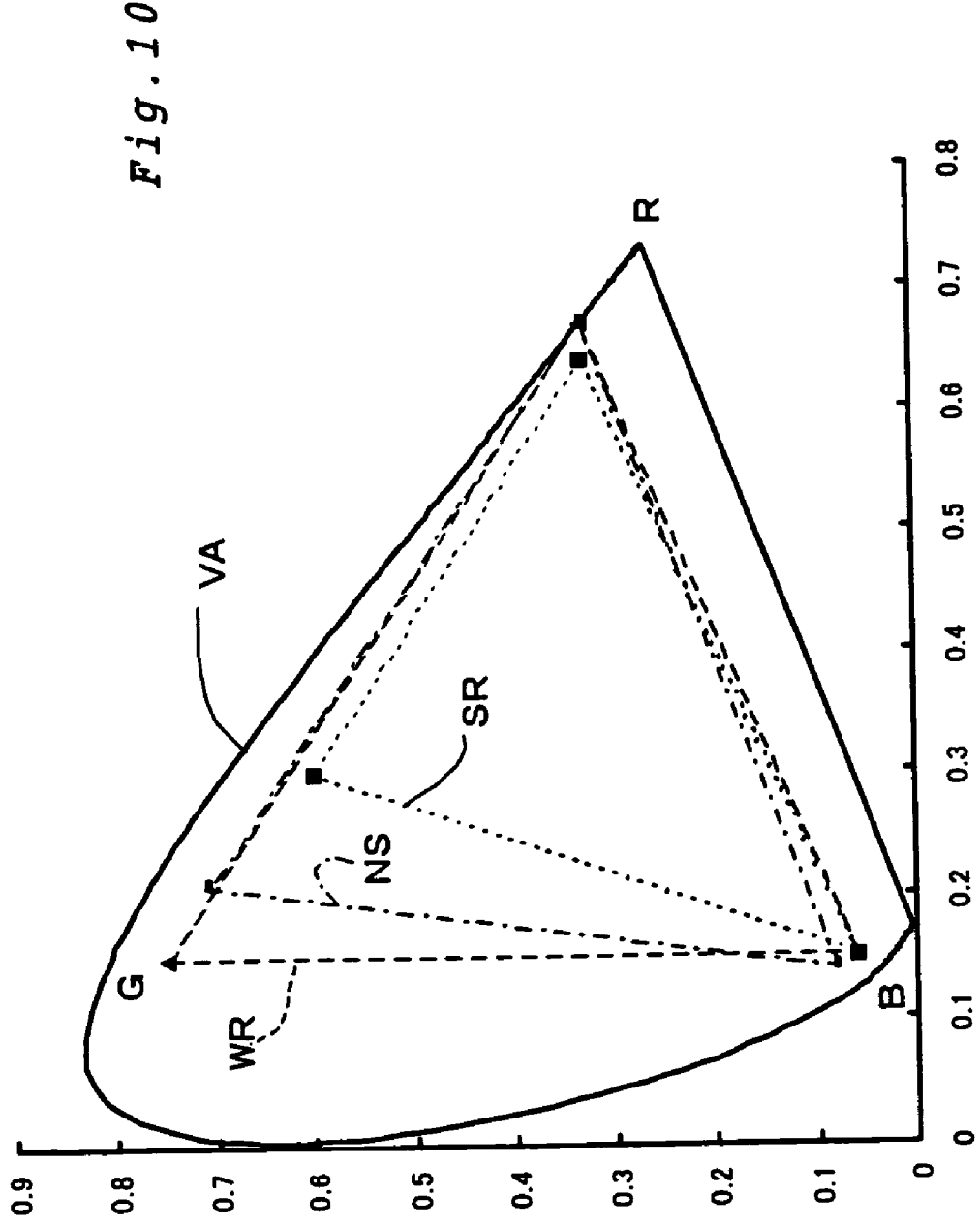
FIG. 10 is an illustrative diagram showing color space ranges for the visible area (VA), sRGB (SR), NTSC (NS), and wRGB (WR).

The color space gamuts for the visible range (VA), sRGB (SR), NTSC (NS) and wRGB (WR) in the RGB color space are shown in FIG. 10. As will be apparent from FIG. 10, the sRGB color space has the narrowest gamut, with the NTSC color space and wRGB color space having gamuts exceeding that of the sRGB color space.

The color space of the image data GD derived from matrix operation M is the XYZ color space. In conventional practice, sRGB is the default color space for image processing in printers and computers, so the native color space of digital still camera 12 cannot be utilized to full advantage. In the present embodiment, on the other hand, the color space used for generation of image data is specified as a target color space in the image processing control information GI in the image file GF, and the printer (printer driver) modifies the matrix (M) for matrix operation M in response to the specified color space. Accordingly, even if digital still camera 12 generates image data in the NTSC color space—whose RGB color space color characteristic is 1 and which has a wider [color] space than the sRGB color space—the color space used for generating the image data can nonetheless be utilized effectively, so as to achieve accurate color reproduction.

In order to perform image adjustment based on arbitrary information, CPU 31 converts the image data GD from the XYZ to the wRGB color space, i.e., it performs a matrix operation $N^{-1}$ and inverse gamma correction (STEP S230). As shown in FIG. 10, the wRGB color space is wider than the sRGB color space, so even second positive color values and negative color values that are out of gamut of the sRGB color space and cannot be represented can be allowed as reproducible color values lying within the gamut of the wRGB color space. During inverse gamma correction CPU 31 refers to color printer 20 gamma values included in the parameters described earlier, and performs inverse gamma conversion on the image data using the inverses of the set gamma values. When performing matrix operation $N^{-1}$ CPU 31 uses a matrix ($N^{-1}$)—corresponding to conversion to the wRGB color space—from ROM 31 to perform the matrix operation.

Matrix operation $N^{-1}$ is given by the equation shown in FIG. 15.

The color space of the image data GD derived from matrix operation $N^{-1}$ is the wRGB color space. As noted, this wRGB color space is wider than the sRGB color space, and corresponds to the RGB color space representable by digital still camera 12.

CPU 31 performs automatic image adjustment to impart features to the image (STEP S240). Here, processing is performed in accordance with information relating to image quality contained in the image processing control information GI. During automatic image adjustment CPU 31 refers to the aforementioned parameters—specifically the parameter values brightness, sharpness etc., and performs image adjustment on the image data using set parameter values. Where automatic adjustment parameters are specified, other arbitrarily established parameters may be reflected based on parameter values specified by automatic adjustment parameters.

Even where these image quality adjustment parameters are not specified in the image processing control information GI of an image file GF, since automatic image adjustment parameters are automatically appended by the digital still camera 12, CPU 31 performs image quality adjustment according to these automatic adjustment parameters.

CPU 31 performs wRGB color conversion and halftone processing for printing (STEP S250). In wRGB color conversion processing, CPU 31 refers to a lookup table (LUT) for CMYK color space conversion, associated with the wRGB color space and stored in ROM 32, and converts the image data from the wRGB color space to the CMYK color space. Specifically, image data consisting of R·G·B grayscale values is converted, for example, to grayscale data for each of six colors C·M·Y·K·LC·LM.

In halftone processing, the color-converted image data is subjected to grayscaling. In the present embodiment, color-converted data is represented as data having 256 shades for each color. In contrast, the color printer 20 in the embodiment can only assume one of two states: "print a dot" or "do not print a dot". That is, the printer 20 herein can only produce two shades in a given location. Thus, 256-shade image data is converted into image data that the color printer 20 can represent using two shades. Representative methods for two-shade conversion (binarization) are the error diffusion technique and the systematic dithering technique.

In color printer 20, if, prior to color conversion, the resolution of image data is lower than the print resolution, new data lying between adjacent image data is generated by way of linear interpolation; if, conversely, it is higher than the print resolution, a resolution conversion process wherein data is divided by a certain ratio to convert the image data resolution to the print resolution is performed. Color printer 20 subjects image data converted to dot print/not print format to an interlacing process wherein the data is rearranged in the sequence in which it will be sent to the color printer 20.

In the present embodiment, all image processing is performed in the color printer 20, and a dot pattern is produced on a print medium according to the image data generated thereby. However, all or a portion of the image processing can be performed by the computer PC. This can be achieved by providing an image data processing application installed on the hard disk etc. of the computer PC with an image processing function, described with reference to FIG. 7. An image file GF generated by digital still camera 12 is supplied to computer PC via a cable CV or via a memory card MC. The application is run on the PC under user control, whereupon the application reads the image file GF, analyzes the image processing control information GI, and converts and adjusts the image data GD. Alternatively, the application can be designed to run automatically when detecting insertion of a memory card MC or detecting attachment of a cable CV, or reception of a wireless print command signal, whereupon the application reads the image file GF, analyzes the image processing control information GI, and converts and adjusts the image data GD automatically.

By way of image processing by color printer 20 in accordance with to the first embodiment described hereinabove, second positive color values and negative color values generated during conversion of image data from a YCbCr color space to an RGB color space are allowed and can be utilized in image processing. Color printer 20 is provided with a CMYK color space conversion table associated with the wRGB color space, which is wider than the sRGB color space. Accordingly, color values, generated by a digital still camera 12, that lie outside the gamut of the sRGB color space are allowed, and color values outside the sRGB color space gamut can be utilized to achieve print output with higher saturation. That is, color values that exceed the gamut of the sRGB color space and cannot be represented thereby can be utilized to achieve print output with higher saturation.

Image processing by color printer 20 can be performed so as to reflect color space information described by the Color-Space tag in the image processing control information GI of image file GF. Accordingly, image processing can be performed in accordance with color space characteristics specified by the digital still camera 12, and differences between photographed images and color printer 20 output due to differences in color spaces [used by the devices] can be eliminated. The color reproduction capabilities of the digital still camera 12 can be reproduced correctly.

D. Other Embodiments

Figure 11:
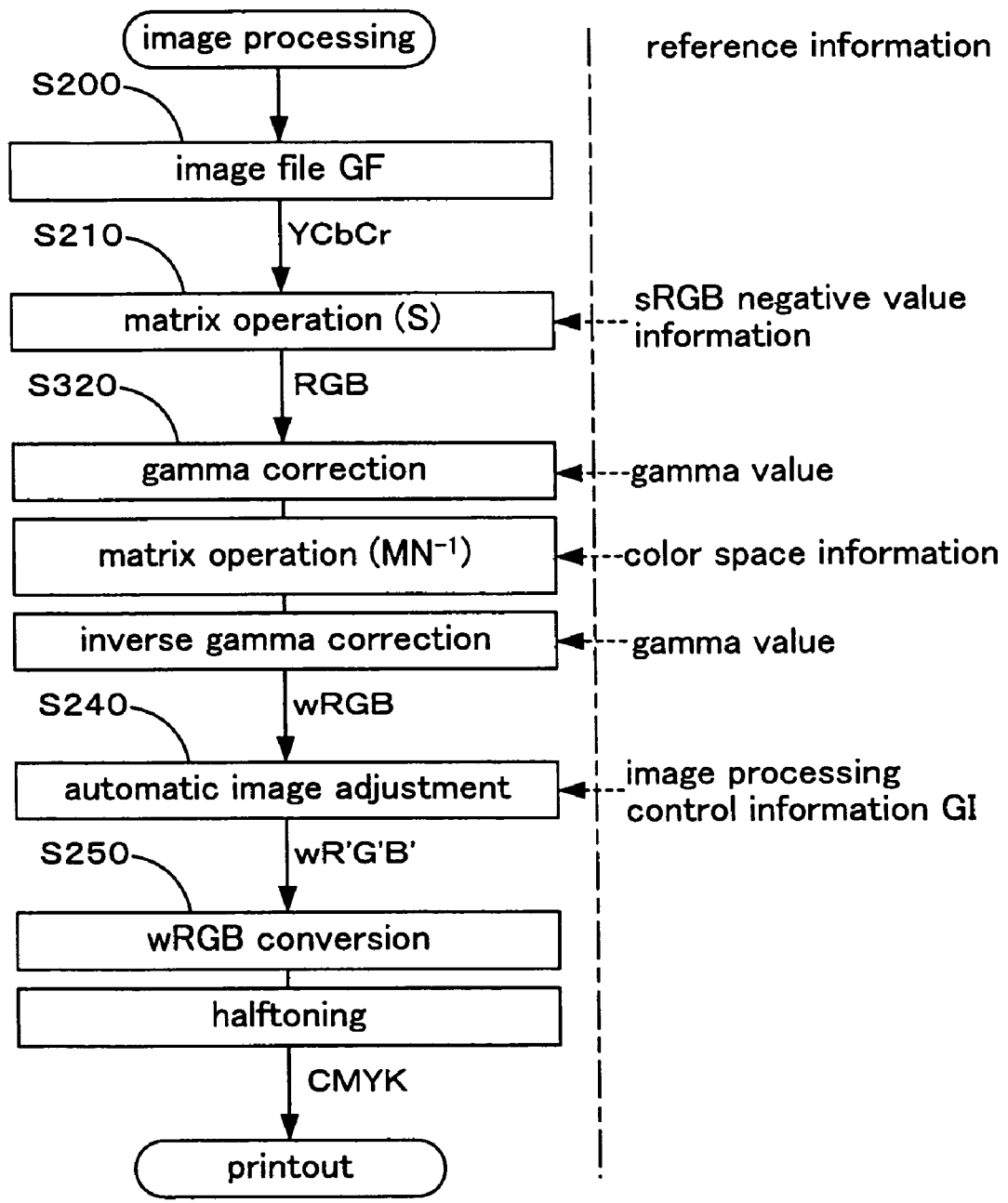
FIG. 11 is a flow chart depicting image processing in a color printer as a second embodiment.

Image processing in color printer 20 may also be performed in the manner shown in FIG. 11. FIG. 11 is a flow chart depicting image processing in a color printer 20 as a second embodiment. In this embodiment, during conversion of color space characteristics from the sRGB color space to the wRGB color space, image processing is accelerated by making matrix operation M and matrix operation $N^{-1}$ into a single matrix operation $(MN^{-1})$ (STEP S320).

Figure 12:
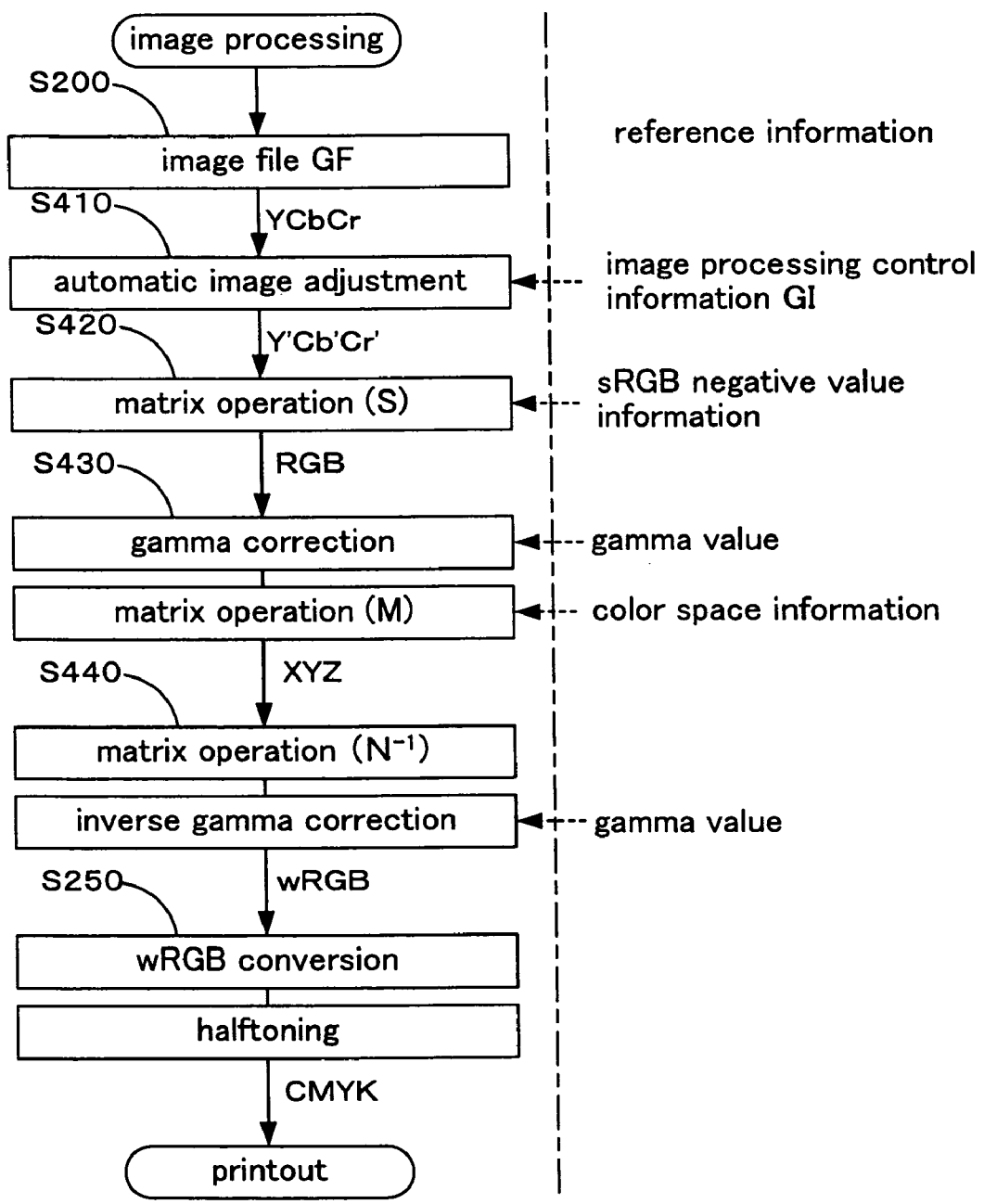
FIG. 12 is a flow chart depicting image processing in a color printer as a third embodiment.

Image processing in a color printer 20 may also be performed as indicated in FIG. 12. FIG. 12 is a flow chart depicting image processing in a color printer 20 as a third embodiment. In this embodiment, automatic image adjustment of image data not represented in the YCbCr color space is performed first (STEP 410). Next, image data on which automatic image adjustment has been completed is subjected to sequential color space conversions by way of a matrix S operation (STEP S420), a matrix M operation (STEP S430), and a matrix $N^{-1}$ operation (STEP S440).

Figure 16:
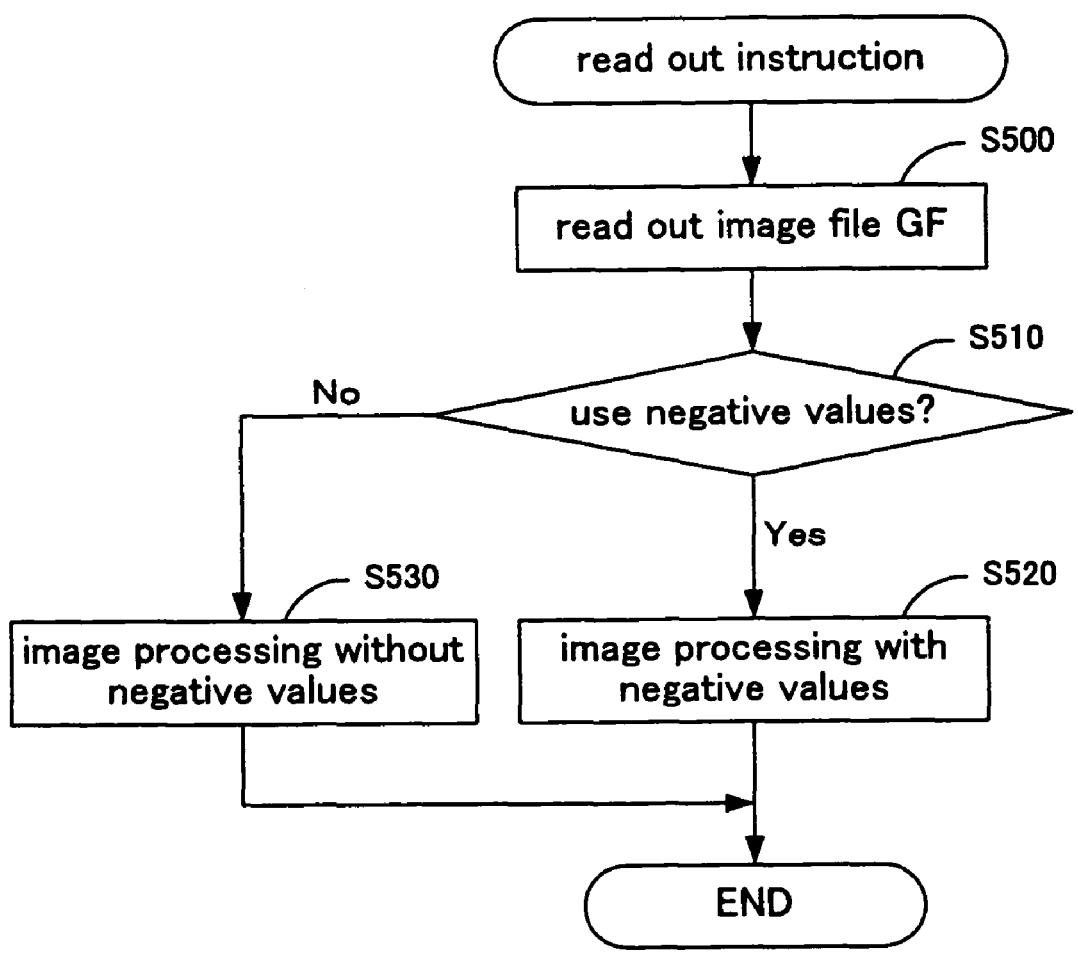
FIG. 16 is a flow chart depicting image processing in a personal computer in accordance with a fourth embodiment.

In the above embodiments, image processing is performed in the color printer 20, and image processing with second positive color values and negative color values is performed when use of negative values is designated in the image process control information GI. In a fourth embodiment, image processing is performed in a personal computer PC, and image processing with second positive color values and negative color values is performed when use of negative values is instructed by an operator via input devices. The image processing performed in the personal computer PC will be described with FIG. 16. FIG. 16 is a flow chart depicting image processing in a personal computer in accordance with the fourth embodiment.

When a read out of the image file is instructed by the operator, the personal computer PC reads out an image file GF from memory card MC, and temporarily places the image file GF in RAM 33 (STEP S500). The personal computer PC determines whether the use of negative values is instructed by the operator (STEP S510). If personal computer determined an instruction for the use of negative values is instructed (STEP S510: Yes), the personal computer performs image processing with negative values and the second positive values contained in the image data GD (STEP S520), then terminates this processing routine.

If personal computer PC determines the instruction for the use of negative values is not instructed (STEP S510: No), the personal computer PC performs image processing without the negative values and the second positive values contained in the image data GD (STEP S530), then terminates this processing routine. According to this fourth embodiment, since the operator designates whether the negative values is used in image processing, image processing with negative values can be applied to the image file GF without Print-Matching tag (image processing control information GI). Consequently, saturation in the image data is improved when the image file GF does not have the image processing control information GI or the image data is not related to the image processing control information GI.

While all of the preceding embodiments of image processing employ a color printer 20 as the output device, a display device such as a CRT, LCD, projector etc. could also be used as the output device. In this case, depending on the display device used as the output device, an image processing program (display driver) for executing the image processing described in FIG. 7, for example, could be used. Where the CRT, etc., functions as a display device for a computer, the image processing program can be run on the computer. In this case the final output image data will have an RGB color space, not a CMYK color space.

Thus, in a manner analogous to reflecting in the print output of color printer 20 the color space of image data generated by digital still camera 12, it is possible to specify in an image file GF the display on a CRT or other display device. Thus, by including in the image processing control information GI of image file GF parameters adapted to a display device such as a CRT, or by including parameters optimized for the display characteristics of an individual display device, image data GD generated by a digital still camera 12 can be correctly displayed.

In the first embodiment, the image processing control information GI is stored in the image file along with the image data, the image processing control information GI and the image data may be stored separately in the memory card MC.

In the above embodiments, when the image processing control information GI instructs the use of negative data value, or when the use of negative data values is instructed by, for example the operator, the negative data values and the second positive data values are used in the image processing. In addition to these cases, the image processing may be performed with the negative data values and/or the second positive data values without any instructions or designates. That is, the image processing apparatus may perform the image processing with the negative data values and/or the second positive data values as an initial setting. With this arrangement, if the image data includes the negative data values and/or the second positive data values, a result of the image processing reflects the negative data values and/or the second positive data values. Accordingly, a high saturation image can be obtained. On the contrary, if the image data does not include the negative data values and/or the second positive data values, a usual image processing result is available.

Although the image data output device of the invention has been shown and described with respect to certain preferred embodiments, these embodiments merely serve to facilitate understanding of the invention and should not be construed as limiting. It is obvious that equivalent alterations and modifications will occur to others skilled in the art without departing from the scope and spirit of the invention.

For example, whereas in the first embodiment, a process to allow second positive color values and negative color values during matrix S operation and a process to reflect specified color space information during matrix M operation are performed at the same time, but these processes need not be performed at the same time. For example, the color space used during matrix M operation could be set by default to the wRGB color space, performing only process to allow second positive color values and negative color values during matrix S operation. With this arrangement, colors that can be represented by digital still camera 12 but not in the sRGB color space due to values outside the gamut of the sRGB color space can be represented, allowing output image saturation to be improved.

Rather than using second positive color values and negative color values for processing during matrix S operation, processing could be made to reflect color space information when the image was taken, or specified color space information during matrix M operation. With this arrangement, the color space used for generating image data can be interpreted correctly during image processing so as to achieve correct color representation. Thus, color space conversion can be performed in a device-independent manner, without affecting the native color space of the input device, output device, etc. As a result, output similar to the image data output obtained when a photographic image is taken can be obtained from the output device.

Whereas, in the preceding embodiments, image processing control information GI specifies if negative values are used, image processing control information GI may specify a gamma correction value for positive values and a gamma correction value for negative values, without specifying if negative values are used. Negative values in image data GD mainly pose a problem in gamma correction processing. Thus, by using different gamma correction values for positive data and negative data during gamma correction, image processing can be performed without the need to specify if negative values are used.

Further, the parameters given hereinabove are merely exemplary and not intended as limiting of the invention. Similarly the matrix values in the matrices S, M and $N^{-1}$ given by the equations are merely exemplary, and may be modified appropriately depending on the target color space, the color space used by the color printer 20, or other considerations.

While the embodiments set forth herein describe a digital still camera 12 as the image file generating device, scanners, digital video cameras or the like may be used as well. Where a scanner is used, specification of basic information and optional information for an image file GF may performed on a computer PC, or performed with the scanner independently by providing the scanner with preset buttons having assigned thereto preset information for setting information, or with a display screen and setting buttons for making optional settings.

The color spaces employed in the embodiments set forth herein are merely exemplary, and other color spaces may be used. Image data generated by a digital still camera 12 or other image data generating device can be output so as to reflect the color space of the image data generating device.

While the first embodiment herein describes an Exif format image file GF, the image file format herein is not limited thereto. It is possible to use any image file that includes at a minimum image data for output by an output device, and information pertaining to the color space used in a digital still camera 12 or other image data generating device. The use of such files minimizes differences in output image between image data generated by another image data generating device (image display through the agency of a monitor etc.) and the image output by the output device.

The color printer 20 of the first embodiment is merely exemplary, and the arrangement thereof is not limited to that shown in the embodiments herein. It sufficient for color printer 20 to have at a minimum the ability to analyze image processing control information GI in an image file GF and to output (print) the image in accordance with recorded or specified color space information.

Image files GF that contain image data and image processing control information GI include files created by generating association data associated with the image processing control information GI and storing the image data and image processing control information GI in separate files so as to enable the image data and image processing control information GI to be associated by referring to the association data during image processing. While in this case image data and image processing control information GI are stored in separate files, during image processing using the image processing control information GI, the image data and the image processing control information GI are indivisibly united, so functionality is substantially the same as with storage in a single file. That is, the use of associated image data and image processing control information GI—at least during image processing—is included in the definition of "image file GF" herein. Motion video files stored on optical media such as CD-ROM, CD-R, DVD-ROM and DVD-RAM are also included.

In the preceding embodiments, a digital still camera is used to generate image files, but a digital video camera could be used as well. Files generated by digital video cameras take the form of image files containing static image data and output control information, or motion video files containing motion video data (e.g. in MPEG format) and output control information. Where motion video files are used, some or all of the frames of the video are subjected to output control with reference to the output control information.

Obviously, numerous modifications and variations of the present invention are possible in light of the above teachings. For example, features described for certain embodiments may be combined with other embodiments described herein. It is therefore to be understood that within the scope of the appended claims, the invention may be practiced otherwise than as specifically described herein.

What is claimed is:

1. An image processing apparatus for performing image processing on image data, comprising:
an image data acquirer configured to acquire image data;
a color value range information acquirer configured to acquire a color value range information associated with the acquired image data, wherein the color value range information indicates color value range of the acquired image data in a predetermined color space; and
an image processor configured to implement image processing according to the acquired color value range information,
wherein said image processor performs the image processing including a color conversion of the acquired image data from the predetermined color space to a wider color space including the color value range designated by the color value range information when the wider color space is available, and wherein said image processor performs image processing of said image data via a pre-established color space having a color value range corresponding to that of said predetermined color space when the wider color space is not available.

2. An image processing apparatus according to claim 1, wherein:
said image data is defined in a first color space;
said image data acquirer includes a color space converter configured to convert the image data from said first color space to a second color space; and
said image processor converts the image data in said second color space to a third color space using said color value range information.

3. An image processing apparatus according to claim 2, wherein:
said color space converter converts the image data from said first color space to a second color space by performing a first matrix operation on image data in said first color space, and
said image processor converts the image data in said second color space to a third color space by performing a second matrix operation on image data in said second color space.

4. An image processing apparatus according to claim 1, wherein:
said image data is produced to fall within a first color space and includes
first positive color values lying within a color value range of said predetermined color space,
second positive color values, and
negative color values lying outside the color value range of said predetermined color space; and
said image data acquirer includes
a color space converter configured to convert the color space of said image data from said first color space to a second color space by processing said first positive color values and at least one of said negative color values and said second positive color values.

5. An image processing apparatus according to claim 4, wherein:
said image processor includes a gamma corrector configured to correct gamma information in said image data using a first gamma correction value when said image data contains said at least one of said first and said second positive color values, and using a second gamma correction value that is different from said first gamma correction value when said image data contains negative color values.

6. An image processing apparatus according to claim 5, wherein:
said first color space is an RGB color space having a R component, a G component, and a B component; and
said second gamma correction value includes different component values for each of said R component, said G component, and said B component.

7. An image processing apparatus according to claim 1, wherein the image data is still image data.

8. An image processing apparatus according to claim 1, wherein the image data is motion video data.

9. An image processing apparatus according to claim 1, wherein the wider color space is not available when the color value range information is not acquired.

10. An image data generating device that is separate from an image processing apparatus, comprising:
an image data generator configured to generate image data, wherein the image data includes first positive color values lying within a color value range of the predetermined color space, and at least one of second positive color values and negative color values lying outside the color value range of the predetermined color space;
a color value range information generator configured to generate color value range information, wherein the color value range information indicates color value range of the acquired image data in a predetermined color space; and
an image data output configured to output the image data associated with the color value range information.

11. An image data generating device according to claim 10, wherein the image data is still image data.

12. An image data generating device according to claim 10, wherein the image data is motion video data.

13. A method of image processing on image data, comprising:
acquiring image data;
acquiring a color value range information associated with the acquired image data, wherein the color value range information indicates color value range of the acquired image data in a predetermined color space; and
implementing image processing according to the acquired color value range information, wherein the image processing includes a color conversion of the acquired image data from the predetermined color space to a wider color space including the color value range designated by the color value range information,
wherein said image processing of said image data is implemented via a pre-established color space having a color value range corresponding to that of said predetermined color space when the wider color space is not available.

14. A method according to claim 13, further comprising:
performing a first matrix operation on image data in said first color space; and
performing a second matrix operation on image data in said second color space.

15. A method of image processing according to claim 13, wherein the image data is still image data.

16. A method of image processing according to claim 13, wherein the image data is motion video data.

17. A method according to claim 13, wherein the wider color space is not available when the color value range information is not acquired.

18. A computer program product comprising:
a non-transitory computer-readable medium on which a computer program for performing image processing on image data is stored, the computer program including
program code for acquiring image data;
program code for acquiring a color value range information associated with the acquired image data, wherein the color value range information indicates color value range of the acquired image data in a predetermined color space; and
program code for implementing image processing according to the acquired color value range information, wherein the image processing includes a color conversion of the acquired image data from the predetermined color space to a wider color space including the color value range designated by the color value range information,
wherein said image processing of said image data is implemented via a pre-established color space having a color value range corresponding to that of said predetermined color space when the wider color space is not available.

19. A computer program product according to claim 18, wherein the wider color space is not available when the color value range information is not acquired.

20. A method of generating image data implemented in an image generating device that is separate from an image processing apparatus, comprising:

generating image data, wherein the image data includes first positive color values lying within a color value range of the predetermined color space, and at least one of second positive color values and negative color values lying outside the color value range of the predetermined color space;

generating color value range information, wherein the color value range information indicates color value range of the acquired image data in a predetermined color space; and outputting the image data associated with the color value range information.

* * * * *